(12) United States Patent
Kim

(10) Patent No.: US 12,143,570 B2
(45) Date of Patent: *Nov. 12, 2024

(54) METHOD AND DEVICE FOR VIDEO SIGNAL PROCESSING

(71) Applicant: GUANGDONG OPPO MOBILE TELECOMMUNICATIONS CORP., LTD., Guangdong (CN)

(72) Inventor: Ki Baek Kim, Seo-gu (KR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 19 days.

This patent is subject to a terminal disclaimer.

(21) Appl. No.: 17/932,627

(22) Filed: Sep. 15, 2022

(65) Prior Publication Data

US 2023/0024256 A1 Jan. 26, 2023

Related U.S. Application Data

(63) Continuation of application No. 17/192,733, filed on Mar. 4, 2021, now Pat. No. 11,477,439, which is a
(Continued)

(30) Foreign Application Priority Data

Sep. 7, 2018 (KR) .......................... 10-2018-0107255

(51) Int. Cl.
*H04N 19/105* (2014.01)
*H04N 19/119* (2014.01)
(Continued)

(52) U.S. Cl.
CPC ......... *H04N 19/105* (2014.11); *H04N 19/119* (2014.11); *H04N 19/132* (2014.11); *H04N 19/159* (2014.11); *H04N 19/176* (2014.11)

(58) Field of Classification Search
CPC .. H04N 19/105; H04N 19/132; H04N 19/159; H04N 19/593
See application file for complete search history.

(56) References Cited

U.S. PATENT DOCUMENTS 8,705,619 B2  4/2014 Nguyen
9,036,704 B2  5/2015 Park
(Continued)

FOREIGN PATENT DOCUMENTS

CL   202003275      12/2020
CN   108353185 A    7/2018
(Continued)

OTHER PUBLICATIONS

Intra Prediction via Edge-Based Inpainting; Liu—2008; (Year: 2008).*

(Continued)

*Primary Examiner* — Luis Perez-Fuentes
(74) *Attorney, Agent, or Firm* — PERKINS COIE LLP

(57) ABSTRACT

A method and device for video signal processing are provided. The method includes: an intra prediction mode of a current block is determined, a reference sample for intra prediction of the current block is determined, a predetermined matrix is determined based on the intra prediction mode, and the current block is predicted based on the reference sample and the matrix. The operation of predicting the current block based on the reference sample and the matrix includes a prediction block is generated by applying the matrix to the reference sample.

20 Claims, 9 Drawing Sheets

Related U.S. Application Data continuation of application No. PCT/KR2019/011554, filed on Sep. 6, 2019.

(51) Int. Cl.
*H04N 19/132* (2014.01)
*H04N 19/159* (2014.01)
*H04N 19/176* (2014.01)

(56) References Cited

U.S. PATENT DOCUMENTS

| | | | |
|---|---|---|---|
| 9,392,284 B2 | 7/2016 | Park | |
| 9,426,470 B2 | 8/2016 | Park | |
| 9,426,471 B2 | 8/2016 | Park | |
| 9,445,097 B2 | 9/2016 | Park | |
| 9,769,479 B2 | 9/2017 | Park | |
| 9,788,006 B2* | 10/2017 | Lee | H04N 19/82 |
| 9,912,946 B2 | 3/2018 | Park | |
| 10,171,823 B2 | 1/2019 | Yamamoto | |
| 10,341,656 B2 | 7/2019 | Park | |
| 10,404,980 B1* | 9/2019 | Zhao | H04N 19/593 |
| 10,666,937 B2* | 5/2020 | Zhao | H04N 19/129 |
| 10,798,414 B2* | 10/2020 | Lee | H04N 19/593 |
| 10,819,987 B2 | 10/2020 | Jang | |
| 10,979,727 B2* | 4/2021 | Hannuksela | H04N 19/33 |
| 11,218,716 B2* | 1/2022 | Yu | H04N 19/12 |
| 11,272,175 B2 | 3/2022 | Wang | |
| 11,336,907 B2* | 5/2022 | Ma | H04N 19/593 |
| 11,425,389 B2 | 8/2022 | Deng | |
| 11,477,439 B2* | 10/2022 | Kim | H04N 19/105 |
| 11,528,506 B2* | 12/2022 | Ma | H04N 19/186 |
| 11,627,329 B2* | 4/2023 | Yu | H04N 19/159 375/240.13 |
| 11,831,918 B2 | 11/2023 | Nam | |
| 2008/0219576 A1 | 9/2008 | Jung | |
| 2011/0280304 A1 | 11/2011 | Jeon | |
| 2012/0140821 A1 | 6/2012 | Drugeon | |
| 2012/0170649 A1 | 7/2012 | Chen | |
| 2012/0218432 A1 | 8/2012 | Liu | |
| 2012/0236929 A1 | 9/2012 | Liu | |
| 2014/0219334 A1 | 8/2014 | Park | |
| 2014/0226720 A1 | 8/2014 | Park | |
| 2014/0247883 A1 | 9/2014 | Lee et al. | |
| 2015/0222891 A1 | 8/2015 | Park | |
| 2015/0222892 A1 | 8/2015 | Park | |
| 2015/0222897 A1 | 8/2015 | Park | |
| 2015/0222929 A1 | 8/2015 | Park | |
| 2016/0198189 A1* | 7/2016 | Lee | H04N 19/44 375/240.12 |
| 2016/0353103 A1 | 12/2016 | Park | |
| 2017/0359595 A1 | 12/2017 | Zhang et al. | |
| 2018/0152701 A1 | 5/2018 | Park | |
| 2018/0176594 A1* | 6/2018 | Zhang | H04N 19/59 |
| 2018/0288408 A1 | 10/2018 | Ikai et al. | |
| 2018/0343455 A1 | 11/2018 | Jang et al. | |
| 2019/0191155 A1 | 6/2019 | Ko et al. | |
| 2019/0238835 A1 | 8/2019 | Lee | |
| 2019/0289287 A1 | 9/2019 | Park | |
| 2019/0306511 A1* | 10/2019 | Jang | H04N 19/11 |
| 2019/0313116 A1* | 10/2019 | Lee | H04N 19/119 |
| 2020/0099925 A1* | 3/2020 | Lee | H04N 19/82 |
| 2020/0322611 A1 | 10/2020 | Salehifar et al. | |
| 2020/0329234 A1 | 10/2020 | Lee | |
| 2020/0366900 A1 | 11/2020 | Jun et al. | |
| 2020/0366935 A1 | 11/2020 | Salehifar et al. | |
| 2021/0105459 A1 | 4/2021 | Lee | |
| 2021/0105460 A1 | 4/2021 | Lee | |
| 2021/0105461 A1 | 4/2021 | Lee | |
| 2021/0227260 A1 | 7/2021 | Lee | |
| 2022/0279161 A1 | 9/2022 | Lim | |

FOREIGN PATENT DOCUMENTS

| | | | |
|---|---|---|---|
| CN | 108370441 A | 8/2018 | |
| EP | 2388999 A2 | 11/2011 | |
| EP | 2388999 A3 | 1/2013 | |
| JP | 2014531154 A | 11/2014 | |
| JP | 2017017742 A | 1/2017 | |
| KR | 20080082143 A | 9/2008 | |
| KR | 20180000303 A | 1/2018 | |
| KR | 20180001479 A | 1/2018 | |
| RU | 2586017 C2 | 6/2016 | |
| WO | 2017068856 A1 | 4/2017 | |

OTHER PUBLICATIONS

Efficient multiple line-based intra prediction; Li—2016; (Year: 2016).*
Intra Prediction Using Multiple Reference Lines for Video Coding; Li—2017; (Year: 2017).*
First Office Action of the Russian application No. 2021109293, issued on Feb. 13, 2023. 12 pages with English translation.
First Office Action of the Chinese application No. 202110462138.3, issued on Oct. 31, 2022. 23 pages with English translation.
Second Office Action of the European application No. 19858139.9, issued on Jan. 11, 2023. 5 pages.
Second Office Action of the Canadian application No. 3111982, issued on Jan. 11, 2023. 5 pages.
International Search Report in the international application No. PCT/KR2019/011554, mailed on Dec. 17, 2019.
Dong Liu, al. "Intra Prediction via Edge-Based Inpainting", Year: 2008.
Jiahao Li, al. "Efficient multiple line-based intra prediction for HEVC", Year: 2016.
Jiahao Li, al. "Intra Prediction Using Multiple Reference Lines for Video Coding" , Year: 2017.
Yuebing Jiang, al. "A Unified and Pipelined Hardware Architecture for Implementing Intra Prediction in HEVC"; Year: 2014.
Helle, al. "CE3-related: Non-linear weighted intra prediction (cross-check report in JVETK0262)", Joint Video Experts Team (JVET)of ITU-T SG 16 WP 3 and ISO/IEC JTC I/SC 29/WG11 11th Meeting: Ljubljana, SI, Jul. 10-18, 2018, JVET-K0196-v3.
Non-Final Office Action of the U.S. Appl. No. 17/192,733, issued on Apr. 27, 2021.
Final Office Action of the U.S. Appl. No. 17/192,733, issued on Aug. 23, 2021.
Notice of Allowance of the U.S. Appl. No. 17/192,733, issued on Jun. 8, 2022.
Advisory Action of the U.S. Appl. No. 17/192,733, issued on Nov. 16, 2021.
First Office Action of the Canadian application No. 3111982, issued on Apr. 11, 2022.
Supplementary European Search Report in the European application No. 19858139.9, mailed on Sep. 2, 2021.
Written Opinion of the International Search Authority in the international application No. PCT/KR2019/011554, mailed on Dec. 17, 2019.
Pfaff, J et al. "CE3: Affine linear weighted intra prediction (CE3-4.1, CE3-4.2)" JVET-N0217; JVET of ITU-T SG 16 WP 3 and ISO/IEC JTC 1/SC 29/WG 11. 14th Meeting; Geneva, CH; Mar. 19-27, 2019. 17 pages.
Oral Examination of the European application No. 19858139.9, issued on Jul. 20, 2023. 10 pages.
First Office Action of the Israeli application No. 281221, issued on Jun. 21, 2023. 3 pages.
First Office Action of the Chilean application No. 202100527, issued on Jan. 20, 2022.
Office Action of the Indian application No. 202117007628, issued on Jan. 27, 2022.
Albrecht M et al:"Description of SDR, HDR, and 360° video coding technology proposal by Fraunhofer HHI", 10. JVET Meeting; Apr. 10, 2018-Apr. 20, 2018;San Oiego;(The Joint Vioeo Exploration Team of ISO/IEC JTC1/SC29/WG11 Ano ITU-T SG. 16 ), No. JVET-J0014 Apr. 2, 2018 (Apr. 2, 2018), XP030151172, Retrieved from the Internet: URL:http://phenix.int-evry.fr/jvet/doc_end_user/documents/1O_San%20Diego/wg11/JVET-J0014-v1.zip JVET-J0014.docx[retrieved on Apr. 2, 2018].

(56) References Cited

OTHER PUBLICATIONS

Helle (Fraunhofer) P et al:"CE3-related: Non-linear weighted intra prediction (cross-check report in JVET-K0262)", 11. JVET Meeting; Jul. 11, 2018-Jul. 18, 2018; Ljubljana; (The Joint Video Exploration Team of ISO/ IEC JTC1/SC29/WG11 and ITU-T SG. 16 ), No. JVET-K0196 Jul. 11, 2018 (Jul. 11, 2018), XP030199426, Retrieved from the Internet:URL:http://phenix.intevry.fr/jvet/doc_end_user/documents/11_Ljubljana/wg11 /JVET-K0196-v3.zipJVET-K0196_r2.docx[retrieved on Jul. 11, 2018].
First Office Action of the European application No. 19858139.9, issued on Mar. 9, 2022.
First Office Action of the Japanese application No. 2021-512701, issued on Sep. 26, 2023. 12 pages with English translation.
Decision to Refuse of the European application No. 19858139.9, issued on Feb. 8, 2024. 11 pages.
First Office Action of the Mexican application No. MX/a/2021/002608, issued on Jan. 26, 2024. 11 pages with English translation.
Hearing Notice of the Indian application No. 202117007628, issued on Jan. 18, 2024. 3 pages with English translation.
First Office Action of the U.S. Appl. No. 17/932,585, issued on Dec. 20, 2023. 34 pages.
First Office Action of the U.S. Appl. No. 17/932,632, issued on Jan. 2, 2024. 50 pages.
First Office Action of the U.S. Appl. No. 17/932,636, issued on Jan. 3, 2024. 50 pages.
First Office Action of the Vietnamese application No. 1-2021-01662, issued on Mar. 27, 2024. 3 pages with English translation.
First Office Action of the Australian application No. 2019336038, issued on May 7, 2024. 3 pages.
Pfaff, J. et al., "Intra prediction modes based on neural networks", Document: JVET-J0037, Joint Video Experts Team (JVET) of ITU-T SG 16 WP 3 and ISO/IEC JTC 1/SC 29/WG 11 10th Meeting, San Diego, Apr. 10, 2018. the whole document, 14 pages.
Final Office Action of the U.S. Appl. No. 17/932,585, issued on May 29, 2024. 13 pages.
Final Office Action of the U.S. Appl. No. 17/932,632, issued on Jun. 3, 2024. 10 pages.
Final Office Action of the U.S. Appl. No. 17/932,636, issued on Jun. 3, 2024. 10 pages.
First Office Action of the Malaysian application No. PI2021001129, issued on Aug. 22, 2024. 3 pages.
Second Office Action of the Mexican application No. MX/a/2021/002608, issued on Jun. 21, 2024. 14 pages with English translation.
Notice of Allowance of the U.S. Appl. No. 17/932,585, issued on Aug. 7, 2024. 9 pages.
Notice of Advisory Action of the U.S. Appl. No. 17/932,585, issued on Aug. 7, 2024. 17 pages.
Notice of Advisory Action of the U.S. Appl. No. 17/932,632, issued on Aug. 14, 2024. 16 pages.
Notice of Allowance of the U.S. Appl. No. 17/932,632, issued on Aug. 14, 2024. 13 pages.
Notice of Allowance of the U.S. Appl. No. 17/932,636, issued on Aug. 15, 2024. 13 pages.

\* cited by examiner

METHOD AND DEVICE FOR VIDEO SIGNAL PROCESSING

CROSS-REFERENCE TO RELATED APPLICATION

The present disclosure is a U.S. continuation application of U.S. patent application Ser. No. 17/192,733 filed on Mar. 4, 2021, which is a continuation of International Application No. PCT/KR2019/011554, filed on Sep. 6, 2019, which claims priority to the Korean application No. 10-2018-0107255, filed to the Korean Patent Office on Sep. 7, 2018. The contents of the U.S. patent application Ser. No. 17/192,733, the International Application No. PCT/KR2019/011554 and the Korean application No. 10-2018-0107255 are incorporated herein by reference in their entirety.

BACKGROUND

With the popularization of the Internet and portable terminals and the development of information and communication technologies, the use of multimedia data is rapidly increasing. Therefore, in order to perform various services or tasks through picture prediction in various systems, the demand for improving the performance and efficiency of the picture processing system is increasing significantly. However, the results of research and development for this situation are insufficient.

SUMMARY

The present invention relates to a picture encoding/decoding method and device, and particularly, to a method and device for video signal processing.

A first aspect provides a method for video signal processing, which is performed by a decoder and may include the following operations. An intra prediction mode of a current block is determined, a reference sample used for intra prediction of the current block is determined, a predetermined matrix is determined based on the intra prediction mode, and the current block is predicted based on the reference sample and the matrix. The operation of predicting the current block based on the reference sample and the matrix includes a prediction block is generated by applying the matrix to the reference sample.

A second aspect provides a method for video signal processing which is performed by an encoder and may include the following operations. An intra prediction mode of a current block is determined, a reference sample used for intra prediction of the current block is determined, a predetermined matrix is determined based on the intra prediction mode, and the current block is predicted based on the reference sample and the matrix. The operation of predicting the current block based on the reference sample and the matrix includes a prediction block is generated by applying the matrix to the reference sample.

A third aspect provides a decoder, which includes a processor; and a memory, wherein the memory is configured to store computer programs capable of running in the processor, and when the computer programs are run by the processor, the processor is configured to determine an intra prediction mode of a current block, determine a reference sample used for an intra prediction of the current block, determine a predetermined matrix based on the intra prediction mode; and generate a prediction block by applying the matrix to the reference sample.

A fourth aspect provides an encoder, which includes a processor; and a memory, wherein the memory is configured to store computer programs capable of running in the processor, and when the computer programs are run by the processor, the processor is configured to determine an intra prediction mode of a current block, determine a reference sample used for an intra prediction of the current block, determine a predetermined matrix based on the intra prediction mode; and generate a prediction block by applying the matrix to the reference sample.

DETAILED DESCRIPTION

Figure 1:
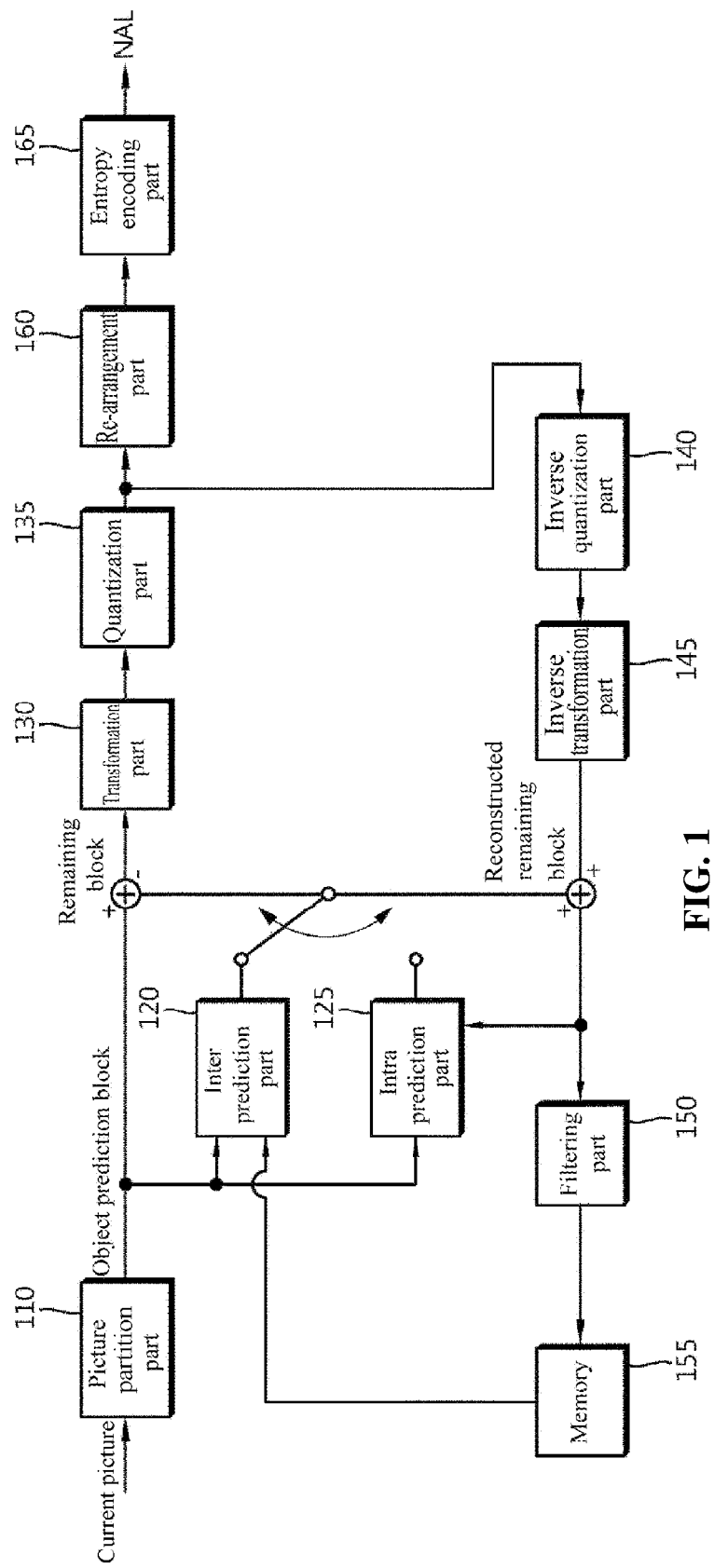
FIG. 1 illustrates a schematic block diagram for an encoding device as an embodiment of the present invention.

In the method and device for image encoding/image decoding in the prior art, it is needed to improve image processing, especially the performance of image encoding or image decoding needs to be improved.

An object of the present invention is to improve encoding/decoding efficiency through adaptive block segmentation.

An object of the present invention is to improve encoding/decoding efficiency through matrix-based intra prediction.

The present invention provides a method and device for determining a reference sample and a matrix for matrix-based intra prediction.

The present invention provides a method and device for down-sampling and up-sampling of matrix-based intra prediction.

According to the method and device for video signal processing of the present invention, an intra prediction mode of a current block is determined, a reference sample used for intra prediction of the current block is determined, a predetermined matrix is determined based on the intra prediction mode, and the current block is predicted based on the reference sample and the matrix.

In the method and device for video signal processing of the present invention, the reference sample is determined may include the following operations. Neighboring region of the current block is determined, and down-sampling is performed on the determined neighboring region.

In the method and device for video signal processing of the present invention, the neighboring region is divided into a plurality of sample groups. The sample group comprises one or more samples. A representative value of the sample group is determined by the reference sample. The representative value may be one of the following: an average, a minimum, a maximum, a mode value and an intermediate value.

In the method and device for video signal processing of the present invention, the matrix is determined by further consideration of encoding information of the current block. The encoding information comprises a size and shape of the current block and an angle or directivity of the intra prediction mode.

In the method and device for video signal processing of the present invention, the current block is predicted may include following operation. A prediction block is generated by applying the matrix to the reference sample.

In the method and device for video signal processing of the present invention, the current block is predicted may further include following operation. Re-arrangement is performed on all or part of prediction samples of generated prediction sample.

In the method and device for video signal processing of the present invention, the current block is predicted may further include following operation. Interpolation is performed on the current block based on at least one of the following: the prediction block or reconstructed samples adjacent to the current block.

According to the present invention, the encoding/decoding efficiency may be improved by segmenting the tree structure block.

According to the present invention, the encoding/decoding efficiency may be improved through matrix-based intra prediction.

According to the present invention, the encoding/decoding efficiency may be improved through down-sampling or up-sampling used for matrix-based intra prediction.

The present invention may be changed and modified variously, and the present invention may have various embodiments. Specific embodiments are shown in the drawings and described in detail. However, it is to be understood that, these specific embodiments are not intended to limit the invention in specific implementation manners, but are construed as including all modifications, equivalents or replacements which belong to the spirit and technical scope of the invention. When each drawing is described, similar reference numerals refer to similar constituent elements.

Although the terms first, second, etc. may be used to describe constituent elements, the constituent elements should not be limited by these terms. These terms are used only to distinguish one constituent element from another constituent element. For example, a first constituent element could be termed a second constituent element and a second element could be termed a first element likewise without departing from the teachings of the present invention. The term "and/or" refers to combinations of a plurality of associated listed items or any one of the plurality of associated listed items.

It will be understood that when a certain constituent element is referred to as being "connected to" or "coupled to" another constituent element, the constituent element can be directly connected or coupled to the another element. And there may also be other constituent elements between the constituent element and another one constituent element. On the contrary, when a certain constituent element is referred to as being "directly connected to" or "directly coupled to" another constituent element, there are no other constituent elements existed between the constituent element and the another constituent element.

The terminology used herein is for the purpose of describing particular embodiments only and is not intended to be limiting of the invention. If other meanings are not clearly expressed in the text, the singular expression includes the plural expression. In the present disclosure, it will be further understood that the terms "include" or "have," specify the presence of stated features, integers, steps, operations, constituent elements, components or their combination that are described in the specification, but do not preclude the presence or addition of one or more other features, integers, steps, operations, elements, components, and/or groups thereof.

If there is no other definition, all terms including technical or scientific terms have the same meaning as generally understood by those skilled in the art. The terms defined in commonly used dictionaries should be interpreted as consistent with the meanings in relevant technical documents. If they are not clearly defined in the present disclosure, their meanings should not be interpreted as ideal or excessive formality.

Hereinafter, preferred exemplary embodiments of the invention will be described in detail with reference to the accompanying drawings. Like reference numerals in the drawings refer to like constituent elements throughout, and redundant descriptions of like constituent elements will be omitted herein.

FIG. 1 illustrates a schematic block diagram for an encoding device as an embodiment of the present invention.

Referring to FIG. 1, the encoding device 100 includes a picture partition part 110, prediction parts 120 and 125, a transformation part 130, a quantization part 135, a rearrangement part 160, an entropy encoding part 165, an inverse quantization part 140, an inverse transformation part 145, a filtering part 150, and a memory 155.

Each of the constituent parts shown in FIG. 1 is shown individually to represent different characteristic functions in the picture encoding device, and this may represent that each constituent part is constituted by a separate hardware. However, for ease of description, each constituent part is listed as an individual constituent part and is included. At least two constituent parts in all constituent parts may constitute one constituent part, or one constituent part may be divided into multiple constituent parts to perform functions. Such comprehensive embodiments and individual embodiments of each constituent part, as long as they do not depart from the essence of the present invention, are also included in the scope of rights of the present invention.

Some constituent elements may be optional constituent elements for merely improving performance and may be not essential constituent elements for performing the substantial functions in the invention. The invention may be implemented by including only the constituent parts, which are essential to embodiment of the invention, except for constituent parts used to merely improve performance. The structure including only the essential constituent parts except for the optical constituent parts used to merely improve performance belongs to the scope of the invention.

The picture partition part 110 may divide the input picture into at least one block. At this time, the block may represent a coding unit (CU), a prediction unit (PU), or a transformation unit (TU). The division may be performed based on at least one of the following: a Quad tree, a Binary tree, and a Ternary tree. A Quad tree is a manner of dividing an upper block into lower blocks having half width and height of the upper block in a quad division manner A Binary tree is a manner of dividing an upper block into lower blocks having at least one of the width or height of half of upper block in a binary division manner. In the division of the Binary tree, the block may not only have a shape of square but also may have a shape of non-square through the division based on the above Binary tree and having a height of half of the upper block.

Hereinafter, in the embodiments of the present invention, the coding unit may be a unit for performing encoding, and may also be a unit for performing decoding.

The prediction parts 120 and 125 may include an inter prediction part 120 for performing inter prediction and an intra prediction part 125 for performing intra prediction. Which of inter prediction and intra prediction is performed on the prediction unit is determined, and specific information (for example, intra prediction mode, motion vector, reference picture, etc.) according to each prediction method may be determined. Here, the processing unit for performing prediction may be different from the processing unit for determining the prediction method and the specific content. For example, the prediction method, the prediction mode, and the like may be determined by the prediction unit, and the prediction may also be performed by the transformation unit. A residual value (residual block) between the generated prediction block and the original block may be input to the transformation part 130. In addition, in the entropy encoding part 165, prediction mode information, motion vector information, and the like that are used for prediction may be encoded together with the residual value and transmitted to the decoding device. When a specific coding mode is used, the original block may also be encoded in original manner and transmitted to the decoding par, without the need of generating the prediction block through the prediction parts 120 and 125.

The inter prediction part 120 may predict the prediction unit based on the information of at least one of a previous picture of the current picture or a following picture of the current picture, and may also predict the prediction unit based on information of some encoded regions in the current picture according to the situation. The inter prediction unit 120 may include a reference picture interpolation part, a motion prediction part, and a motion compensation part.

In the reference picture interpolation part, the information of the reference picture is provided by the memory 155, and pixel information less than or equal to an integer pixel may be generated on the reference picture. For luma pixels, in order to generate pixel information less than or equal to an integer pixel in a unit of a ¼ pixel, a DCT-based 8-tap Interpolation Filter with different filter coefficients may be used. For chroma signals, in order to generate pixel information less than or equal to an integer pixel in a unit of ⅛ pixel, a DCT-based 4-tap Interpolation Filter with different filter coefficients may be used.

The motion prediction part may perform motion prediction based on the reference picture interpolated by the reference picture interpolation part. Various methods, such as a Full search-based Block Matching Algorithm (FBMA), a Three Step Search (TSS), a New Three-Step Search Algorithm (NTS), and the like, may be used to calculate a motion vector. The motion vector may have a motion vector value in a unit of ½ or ¼ pixel based on the interpolated pixel. The motion prediction part may predict the current prediction unit through different motion prediction methods. Various methods, such as a Skip method, a Merge method, an Advanced Motion Vector Prediction (AMVP) method, and the like, may be used as motion prediction method.

The intra prediction part 125 may generate a prediction unit based on information of reference pixels neighboring to a current block, where the information of reference pixels neighboring to the current block is information of pixels in the current picture. Since the neighboring block of the current prediction unit is a block for which inter prediction has been performed, when the reference pixels are pixels for which inter prediction has been performed, the information of the reference pixels included in the block for which inter prediction has been performed may be replaced with the information of reference pixels of the neighboring block for which intra prediction has been performed. That is, when the reference pixels are unavailable, the information of the unavailable reference pixels may be replaced with at least one reference pixel among the available reference pixels.

A prediction mode of intra prediction may include an angular prediction mode in which reference pixel information is used according to a prediction direction and a non-angular mode in which angular information is not used in performing prediction. The mode used to predict the luma component and the mode used to predict the chroma component may be different. The chroma component may be predicted by using the intra prediction mode for predicting the luma component or using the predicted/reconstructed luma component.

The intra prediction method may generate a prediction block after an Adaptive Intra Smoothing (AIS) filter is applied to the reference pixels according to the intra prediction mode. The types of the AIS filter applied to the reference pixels may be different. In order to perform the intra prediction method, the intra prediction mode for the current prediction unit may be predicted from the intra prediction mode of a prediction unit neighboring to the current prediction unit. When the prediction mode for the current prediction unit is predicted by using the mode information predicted from the neighboring prediction unit, if the intra prediction mode for the current prediction unit is the same with that of the neighboring prediction unit, the predetermined flag information may be used to transmit information indicating that the intra prediction mode of the current prediction unit is the same with that of the neighboring prediction unit. If the intra prediction mode of the current prediction unit is different from that of the neighboring prediction unit, entropy encoding may be performed to encode the intra prediction mode information of the current block.

In addition, the prediction parts 120 and 125 may generate Residual value information including a difference value between the generated prediction unit and the original block. The generated residual block may be input to the transformation unit 130.

The transformation part 130 may use transformation, such as DCT, DST and the like, to transform the residual block including residual data. Here, the transformation type may be determined based on the intra prediction mode of the prediction unit used for generating the residual block.

The quantization part 135 may perform quantization on the value transformed into a frequency domain by the transformation part 130. The quantization coefficient may be changed depending on a block or an importance of a picture. A value calculated from the quantization part 135 may be provided to the inverse quantization part 140 and the re-arrangement part 160.

The re-arrangement part 160 may perform re-arrangement on the coefficient value for the quantized residual block. The re-arrangement part 160 may change the coefficients of the two-dimensional block form into a one-dimensional vector form by a coefficient scanning method. For example, the re-arrangement part 160 may use a predetermined scan type to scan from a DC coefficient to a coefficient in the high frequency region to change it into the one-dimensional vector form.

The entropy coding part 165 may perform entropy encoding based on the value calculated by the rearrangement part 160. Various coding methods, such as Exponential Golomb coding, Context-Adaptive Variable Length Coding (CAVLC), Context-Adaptive Binary Arithmetic Coding (CABAC) and the like may be used for entropy encoding.

The entropy coding part 165 may perform encoding on various information, such as residual coefficient information and block type information of the coding unit, prediction mode information, partition unit information, prediction unit information and transformation unit information, motion vector information, reference picture information, block interpolation information, filtering information, and the like, from the re-arrangement part 160 and the prediction parts 120 and 125.

The entropy coding part 165 may perform entropy encoding on the coefficient value of the coding unit input from the re-arrangement part 160.

The inverse quantization part 140 and the inverse transformation part 145 perform inverse quantization on the value quantized by the quantization part 135 and perform inverse transformation on the value transformed by the transformation part 130. The Residual value generated by the inverse quantization part 140 and the inverse transformation part 145 may be combined with the predicted prediction unit through the motion estimation part, the motion compensation part, and the intra prediction part included in the prediction parts 120 and 125 to generate a Reconstructed Block.

The filtering part 150 may include at least one of the following: a deblocking filter, an offset correction part, and an Adaptive Loop Filter (ALF).

The deblocking filter may remove the block distortion caused by the boundary between the blocks in a reconstructed picture. In order to determine whether to perform deblocking, whether the deblocking filter is applied to the current block is determined based on the pixels included in several columns or rows included in the block. When a deblocking filter is applied to a block, a Strong Filter or a Weak Filter may be applied according to a needed deblocking filtering strength. In addition, when applying a deblocking filter and performing vertical filtering and horizontal filtering, horizontal filtering and vertical filtering may be processed parallel.

The offset correction part may correct the offset of the original picture in a unit of pixel for the deblocked picture. In order to perform offset correction for a specific picture, a method that after the pixels included in the picture are divided into a certain number of regions, a region to be offset is determined and the offset is applied to the region is used, or a method that corresponding offset is used according to the edge information of each pixel is used.

Adaptive Loop Filtering (ALF) may be performed based on a comparison value between a filtered reconstructed picture and an original picture. After the pixels included in the picture are divided into predetermined groups, a filter to be applied to the group is determined, and filtering may be performed on each group differently. For information on whether to apply ALF, each Coding Unit (CU) may transmit luma signals, and the form and filter coefficient of the ALF filter to be applied may be changed according to each block. In addition, an ALF filter of the same form (fixed form) may be applied regardless of the characteristics of the applied block.

The memory 155 may store the reconstructed blocks or pictures calculated by the filtering part 150, and the stored reconstructed blocks or pictures may be provided to the prediction parts 120 and 125 when performing inter prediction.

Figure 2:
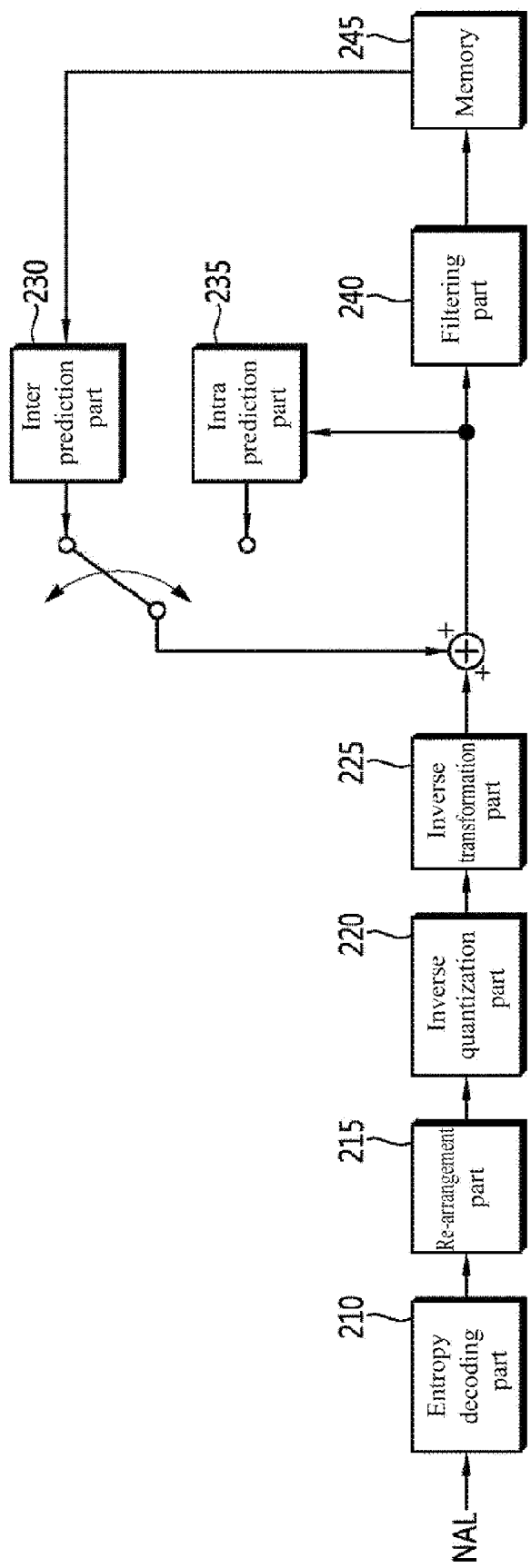
FIG. 2 illustrates a schematic block diagram for a decoding device as an embodiment of the present invention.

FIG. 2 illustrates a schematic block diagram for a decoding device as an embodiment of the present invention.

Referring to FIG. 2, the decoding device 200 may include an entropy decoding part 210, a re-arrangement part 215, an inverse quantization part 220, an inverse transformation part 225, prediction parts 230 and 235, a filtering part 240, and a memory 245.

Each of the constituent parts shown in FIG. 2 is shown individually to represent different characteristic functions in the decoding device, and this may represent that each constituent part is constituted by a separate hardware. However, for ease of description, each constituent part is listed as an individual constituent part and is included. At least two constituent parts in all constituent parts may constitute one constituent part, or one constituent part may be divided into multiple constituent parts to perform functions. Such comprehensive embodiments and individual embodiments of each constituent part, as long as they do not depart from the essence of the present invention, are also included in the scope of rights of the present invention.

The entropy decoding part 210 may perform entropy decoding on the input bitstream. For example, in order to perform entropy decoding, various methods such as Exponential Golomb, Context-Adaptive Variable Length Coding (CAVLC), Context-Adaptive Binary Arithmetic Coding (CABAC) and the like may be applied.

The entropy decoding part 210 may perform decoding on information associate with the intra prediction and inter prediction performed by the encoding device.

The re-arrangement part 215 may perform re-arrangement on the bitstream entropy-decoded by the entropy decoding part 210. The coefficient represented by the one-dimensional vector form may be reconstructed to the coefficient of the two-dimensional block form to perform re-arrangement. The re-arrangement part 215 may receive information about the coefficient scanning performed by the coding device, and may perform re-arrangement by performing inverse scanning based on the scanning order performed by the encoding device.

The inverse quantization part 220 may perform inverse quantization based on the quantization parameter and the coefficient value of the re-arranged block.

The inverse transformation part 225 may perform inverse transforming on the transformation coefficient for inverse quantization according to a predetermined transform type. Here, the transformation type may be determined based on at least one of the following information: the prediction mode (inter/intra prediction), the size/shape of block, the intra prediction mode, the component type (luma/chroma component), partition type (QT, BT, TT, etc.), and the like.

The prediction part s 230 and 235 may generate related information based on the prediction block provided by the entropy decoding part 210 and generate the prediction block based on the information of the previously decoded block or picture which is provided by the memory 245.

The prediction parts 230 and 235 may include a prediction unit determination part, an inter prediction part, and an intra prediction part. The prediction unit determination part may receive various information, such as prediction unit information input by the entropy decoding part 210, information related to the intra prediction mode of the intra prediction method, information related to motion prediction of the inter prediction method, and the like. The current coding unit (CU) distinguishes the prediction unit and determines which of the inter prediction and the intra-frame prediction is performed on the prediction unit. The inter prediction part 230 may utilize information required for the inter prediction of the current prediction unit provided by the coding device, and perform inter prediction for the current prediction unit based on information included in at least one of the previous picture of the current picture or the next picture of the current picture including the current prediction unit. Or, inter prediction may also be performed in the current picture including the current prediction unit based on information of some of the reconstructed regions. For this purpose, some of the reconstructed regions may be added to the reference picture list.

In order to perform inter prediction, it may be determined, based on the coding unit, whether a motion prediction method for a prediction unit included in the coding unit is a Skip Mode, a Merge mode, an AMVP Mode and the reference mode for the current picture.

The intra prediction part 235 may generate a prediction block based on information of pixels in the current picture. When the prediction unit is a prediction unit for which the intra prediction has been performed, the intra prediction may be performed based on the intra prediction mode information of the prediction unit provided by the encoding device. The intra prediction part 235 may include an Adaptive Intra Smoothing (AIS) filter, a reference pixel interpolation part, and a DC filter. As a component for filtering the reference pixels of the current block, the AIS filter may determine whether to apply the filter according to the prediction mode of the current prediction unit. The prediction mode of the prediction unit provided by the encoding device and the AIS filter information may be used to perform AIS filtering on the reference pixels of the current block. When the prediction mode of the current block is a mode not performing AIS filtering, the AIS filter may not be applied.

When the prediction mode of the prediction unit is a prediction mode that intra prediction is performed based on the pixel value obtained by performing interpolation on reference pixels, the reference pixel interpolation part may interpolate the reference pixels to generate reference pixels in a unit less than an integer value. When the prediction mode of the current prediction unit is a prediction mode that a prediction block is generated without interpolating the reference pixels, interpolation may not be performed on the reference pixels. When the prediction mode of the current block is a DC mode, a DC filter may generate the prediction block through filtering.

The reconstructed block or picture may be provided to the filtering part 240. The filtering part 240 may include a deblocking filter, an offset correction part, and ALF.

The information regarding whether to apply a deblocking filter to the block or picture may be received from the encoding device. When the deblocking filter is applied, the information regarding whether a stronger filter or a weaker filter is applied is received. The information associated with the deblocking filter provided by the encoding device may be received by a deblocking filter of the decoding device, and deblocking filtering may be performed on the block by the decoding device.

When encoding is performed, the offset correction part may perform offset correction on the reconstructed picture based on the information of the type of offset correction and the offset value applied to the picture.

The ALF may be applied to a coding unit based on the information of whether the ALF is applied, ALF coefficient information and the like provided by encoder. This kind of ALF information may be provided in a manner of being included in a specific parameter set.

The memory 245 may store the reconstructed pictures or blocks as reference pictures or reference blocks, and may provide the reconstructed pictures to the output part.

Figure 3:
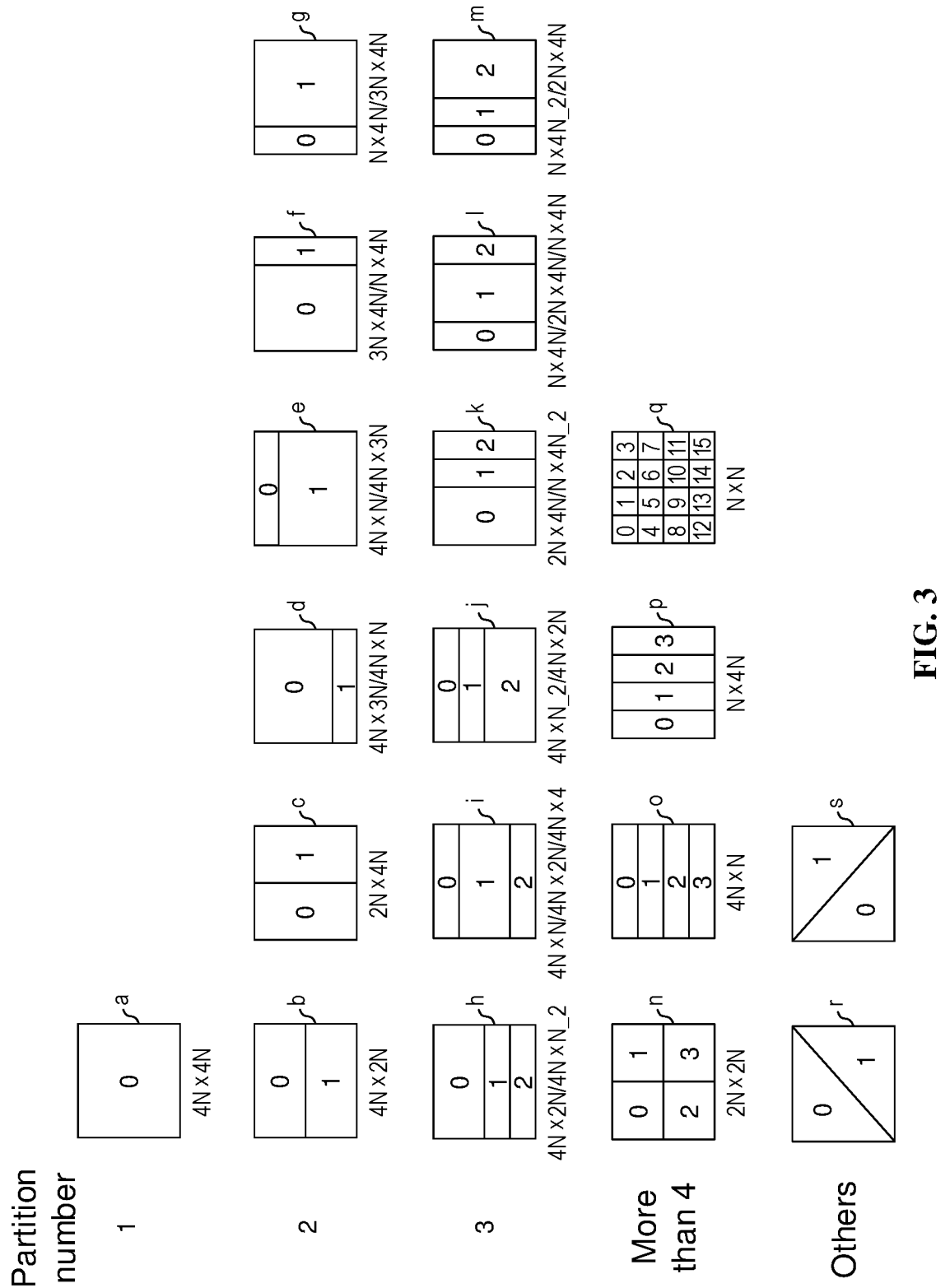
FIG. 3 illustrates block partition types as an embodiment applied to the present invention.

FIG. 3 illustrates block partition types as an embodiment applied to the present invention.

Referring to FIG. 3, the blocks from a to s may be obtained according to the partition setting and the partition manner, and additional block shapes that are not shown may also be obtained.

As an example (1), asymmetric partition may be allowed used for the tree-based partition. For example, for the Binary Tree, it may be a block such as b or c, or it may also be a block such as b-g. When the flag for allowing asymmetric partition is not explicitly or implicitly activated according to encoding/decoding setting, the available candidate block may be b or c. When the flag for allowing asymmetric partition is activated, the available candidate block may be b, d, e (horizontal partition in the example), or c, f, g (vertical partition in the example).

In the example, it is assumed that the length ratio that left:right or top:bottom in the asymmetrically partition is 1:3 or 3:1, which is not limited to this. Other ratios (for example, 1:2, 1:4, 2:3, 2:5, 3:5, etc.) may also be used according to coding setting.

The following shows various examples regarding the partition information generated in the Binary Tree partition (1:1, 1:3, and 3:1 in the example).

For example, in addition to a flag indicating whether to perform partition and a flag indicating the direction of partition, a flag indicating the type of partition may also be generated. Here, the type of the partition may indicate symmetric partition or asymmetric partition. When the asymmetric partition is determined as the type of the partition, a flag indicating the partition ratio may be generated, and an index may be assigned according to a preset partition ratio. If a partition ratio of 1:3 or 3:1 is supported, the partition ratio may be selected through a 1-bit flag.

Alternatively, in addition to the flag indicating whether to perform partition and the flag indicating the direction of partition, a flag indicating the partition ratio may be generated. In the example, a symmetric ratio of 1:1 may be included.

In the present invention, it is assumed (when the flag for allowing asymmetric partition is activated) that the Binary Tree partition has the structure as mentioned in the previous example. Unless otherwise mentioned, the Binary Tree means a symmetric Binary Tree.

As an example (2), additional tree partition may be allowed for tree-based partition. For example, partition may be performed on a Ternary Tree, a Quad Type Tree, an Octa Tree, and the like, through which N partition blocks (3, 4, 8 and n in the example are integers) may be obtained. For the Ternary Tree, the supported block (when partitioned into multiple blocks in the example) may be h~m. For the Quad Type Tree, the supported block may be n~p. For the Octa Tree, the supported block may be q. It may be implicitly determined, according to encoding/decoding setting, whether to support the tree-based partition or explicitly generate related information. In addition, according to coding/decoding setting, it may be used alone or may be used in combination with Binary Tree, Quad Tree partition, or the like.

For example, for a Binary Tree, blocks such as b and c may be used. When a Binary Tree and a Ternary Tree are used together (in the example, it is assumed that the use range of the Binary Tree and the use range of the Ternary Tree are partially overlapped), blocks such as b, c, i or l may be used. When the flag for allowing additional partition other than the current tree is explicitly or implicitly inactivated according to the encoding/decoding setting, the available candidate block may be b or c. When the flag is activated, the available candidate blocks may be b and i or b, h, i and j (horizontal partition in the example), or the available candidate blocks may be c and l or c, k, l and m (vertical partition in the example).

In the example, although the assumption that the length ratio of left:middle:right or top:middle:bottom is 2:1:1 or 1:2:1 or 1:1:2 in the Ternary Tree partition is described, but the invention is not limited to this, other ratios may also be set according to the encoding.

The following shows an example for partition information generated in the Ternary Tree partition (candidate of 1:2:1 in the example).

For example, in addition to a flag indicating whether to perform partition and a flag indicating the direction of partition, a flag indicating the type of partition may also be generated. Here, the type of the partition may represent Binary Tree or Ternary Tree partition.

In the present invention, adaptive encoding/decoding setting may be applied according to the partition manner.

As an example, the partition manner may be determined according to the type of the block. For example, the manner of Quad Tree partition may be used for the coding block and the transformation block, and the manners of Quad Tree and Binary Tree (or Ternary Tree, etc.) may be used for the prediction block.

As an example, the partition manner may be determined according to the size of the block. For example, the manner of Quad Tree partition may be used in some ranges between the maximum value and minimum value of a block (for example, a×b~c×d, when the latter is greater). In some ranges (for example, e×f~g×h), Binary tree (or Ternary Tree, etc.) partition may be performed. Here, the range information according to the partition manner may be explicitly generated or implicitly determined, and it may also be used when the ranges are overlapped.

As an example, a partition manner may be determined according to a shape of a block (or block before the partition is performed). For example, when the shape of the block is square, Quad Tree and Binary tree (or Ternary Tree, etc.) partition may be performed. Alternatively, when the shape of the block is rectangular, partition based on a Binary Tree (or a Ternary Tree, etc.) may be performed.

As an example, the partition setting may be determined according to the type of the block. For example, in tree-based partition, the coding block and the prediction block may use Quad Tree partition, and the transformation block may use Binary Tree partition. Alternatively, the allowable partition depth for the coding block may be set as m, the allowable partition depth for the prediction block may be set as n, and the allowable partition depth for the transformation block may be set as o, and m, n, and o may be same or different.

As an example, the partition setting may be determined according to the size of the block. For example, Quad Tree partition may be used in some ranges of the block (for example, a×b~c×d), and Binary Tree partition may be used in some ranges (for example, e×f~g×h; it is assumed that c×d is greater than g×h in the example) and Ternary Tree partition may be used in some ranges (for example, i×j~k×l; in the example, it is assumed that g×h is greater than or equal to k×l). Here, the ranges may include all ranges between the maximum value of the block and the minimum value of the block, and the ranges may have non-overlapped settings or overlapped settings. For example, a minimum value of some ranges may be the same as a maximum value of some ranges, or a minimum value of some ranges may be less than a maximum value of some ranges. If there are overlapped ranges, the partition manner with a greater maximum value may have a priority order or information for which partition manner is to be used may be explicitly generated. That is, among the partition manners with priority order, whether to perform partition manner with a lower priority may be determined according to a result of partition, or which partition manner is to be used may be determined according to information for selecting partition manner.

As an example, the partition setting may be determined according to a shape of a block. For example, when the shape of the block is square, Quad Tree partition may be used. Alternatively, when the shape of the block is rectangular, a Binary Tree or a Ternary Tree may be used for partition.

As an example, the partition setting may be determined according to encoding/decoding information (for example, slice type, color component, coding mode, etc.). For example, when the slice type is I, the Quad Tree (or Binary Tree, Ternary Tree) partition may be used in some ranges (for example, a×b~c×d). When the slice type is P, it may be used in some ranges (for example, e×f~g×h). When the slice type is B, it may be used in some range (for example, i×j~k×l). In addition, when the slice type is I, the allowable partition depth of Quad Tree partition (or Binary Tree or Ternary Tree partition) may be set as m, when the slice type is P, the allowable partition depth may be set as n, and when the slice type is B, the allowable partition depth may be set as o, m, n and o may be same or different. For some slice types, they may have the same setting with other slices (for example, P and B slices).

As other examples, when the color component is a luma component, the allowable partition depth of Quad Tree (or Binary Tree, Ternary Tree) may be set as m. When the color component is a chroma component, it may be set to n, and m and n may be same or different. In addition, the partition range (for example, a×b~c×d) of the Quad Tree (or Binary Tree, Ternary Tree) in a case where the color component is the luma component may be the same with or different from the partition range (for example, e×f~g×h) of the Quad Tree (or Binary Tree, Ternary Tree) in a case where the color component is the chroma component.

As other examples, when the coding mode is Intra, the allowable partition depth of Quad Tree (or Binary tree, Ternary Tree) may be m. When the coding mode is Inter, it may be n (it is assumed that n is greater than m in the example), and m and n may be same or different. In addition, the range of Quad Tree (or Binary Tree, Ternary Tree) partition in a case where the coding mode is Intra may be the same with or different from the range of Quad Tree (or Binary Tree, Ternary Tree) partition in a case where the coding mode is Inter.

In the example, the information on whether to support the adaptive partition candidate group structure which depends on encoding/decoding information may be explicitly generated or implicitly determined.

The case of determining the partition manner and the partition setting according to the encoding/decoding setting is described through the examples. The examples show that there may be variations in other situations based on some cases of various factors. In addition, the partition manner and the partition setting may also be determined based on a combination of multiple factors. For example, the partition manner and the partition setting may be determined according to a type, size, and shape of a block, encoding/decoding information, and the like.

In addition, factors related to the partition manner, the partition setting, and the like in the example may be implicitly determined or information may be explicitly generated to determine whether the adaptive situations as mentioned in the above examples are allowed.

The partition depth in the partition setting indicates the number of spatial partitions performed based on an initial block (the partition depth of the initial block in the example is 0). The greater the partition depth is, the smaller blocks may be obtained from the partition. Depth-related settings may be set differently according to the partition manner. For example, in the manner of performing tree-based partition, the partition depth of the Binary Tree may be the same as the partition depth of Ternary Tree. The partition depth of the Quad Tree may be different from the partition depth of the Binary Tree. Respective depth may be used according to a type of tree.

In the example, when respective partition depth is used according to the type of tree, the partition depth for a starting position (block before the partition is performed, in the example) of partition of the tree may be set as 0. The partition depth may be calculated by taking a position where partition is performed initially as a center, rather than based on a partition range (the maximum value, in the example) of each tree.

Figure 4:
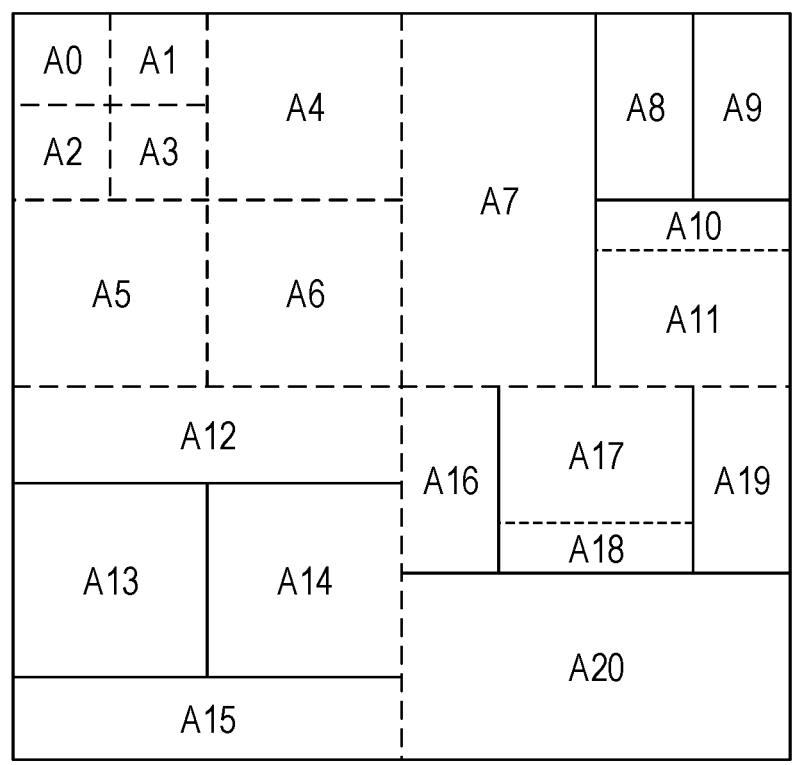
FIG. 4 illustrates a method for segmenting block based on a tree structure as an embodiment applied to the present invention.

FIG. 4 illustrates a method for segmenting block based on a tree structure as an embodiment applied to the present invention.

In the figure, the thick solid line represents a basic coding block, the thick dashed line represents partition boundaries of Quad Tree, the double solid line represents partition boundaries of symmetric Binary Tree, solid line represents partition boundaries of Ternary Tree, and thin solid line represents partition boundaries of asymmetric Binary Tree. The lines, except for the thick solid line, represent the partition boundaries of various partition manners. The partition settings described below (for example, partition type, partition information, partition information configuration order, etc.) are not limited to the case of the example, and there may be various modified examples.

For ease of description, the description is made for the assumption that a top-left block, a top-right block, a bottom-left block, and a bottom-right block (N×N; 64×64), which are based on the basic coding block (2N×2N; 128×128), have their own block partition settings. First, it is assumed that 4 sub-blocks have already been obtained due to a partition operation (partition depth 0→1; that is, the partition depth is increased by 1) for the initial block, and for the partition setting of Quad Tree, in a case where a maximum coding block is 128×128, a minimum coding block is 8×8 and a maximum partition depth is 4, this is a common setting for each block.

(First; Top-Left Blocks; A1~A6)

In the example, a partition manner of single tree (Quad Tree in the example) is supported, a size and shape of an obtained block may be determined through partition setting of a block, such as a maximum coding block, a minimum coding block, and a partition depth. In the example, the number of block obtained by partition is one (bi-partition is performed in the horizontal and vertical directions), the partition information needed for once partition (based on the 4M×4N block before partition, the partition depth increases by 1) is a flag indicating whether to perform partition (if it is 0 in the example, no partition is performed; if it is 1, partition is performed), the obtained candidates may be 4M×4N and 2M×2N.

(Second; Top-Right Blocks; A7~A11)

In the example, a partition manner of multiple trees (Quad Trees and Binary Trees in the example) is supported, a size and shape of an obtained block may be determined through partition settings of multiple blocks. In the example, it is assumed that a maximum coding block for the Binary Tree is 64×64, a length of a minimum coding block is 4, and a maximum partition depth is 4.

In the example, the number of blocks obtained by partition is 2 or more (in the example, 2 or 4), partition information needed for once partition (the partition depth of Quad Tree increases by 1) is a flag indicating whether to perform partition, a flag indicating partition type, and a flag indicating partition direction. The available candidates may be 4M×4N, 4M×2N, 2M×4N, 4M×N/4M×3N, 4M×3N/4M×N, M×4N/3M×4N and 3M×4N/M×4N.

If the partition range of Quad Tree is overlapped with the partition range of Binary Tree (that is, the ranges that Quad Tree partition and Binary Tree partition can be performed in the current step), and the current block (the state before partition is performed) is a block that is obtained through Quad Tree partition (blocks that are obtained by Quad Tree partition in the parent block<partition depth less than the current partition depth by 1>), the partition information may be distinguished and configured in the following cases. That is, when the blocks supported according to various partition settings can be obtained by multiple partition methods, classification may be performed in the following manner to generate partition information.

(1) The Case where the Quad Tree Partition is Overlapped with the Binary Tree Partition.

TABLE 1

|  | a | b | c | d | e |
|---|---|---|---|---|---|
| QT | 1 | | | | |
| No Split | 0 | 0 | | | |
| SBT hor | 0 | 1 | 0 | 0 | |
| ABT hor ¼ | 0 | 1 | 0 | 1 | 0 |
| ABT hor ¾ | 0 | 1 | 0 | 1 | 1 |
| SBT ver | 0 | 1 | 1 | 0 | |
| ABT ver ¼ | 0 | 1 | 1 | 1 | 0 |
| ABT ver ¾ | 0 | 1 | 1 | 1 | 1 |

In the table, a is a flag indicating whether to perform Quad Tree partition, and 1 indicates performing Quad Tree partition (QT). If the flag is 0, a flag b indicating whether to perform Binary Tree partition is determined. If b is 0, no partition is performed on the block any more (No Split). If b is 1, Binary Tree partition is performed.

c is a flag indicating the partition direction. If c is 0, it is indicated that horizontal partition (hor) is performed. If c is 1, it is indicated that vertical partition (ver) is performed. d is a flag indicating the partition type. If d is 0, it is indicated that Symmetric Binary Tree (SBT) is performed. If d is 1, it is indicated that Asymmetric Binary Tree (ABT) is performed. Only when d is 1, the detailed partition ratio information (¼ or ¾) for Asymmetric Binary Tree is determined. If d is 0, in the left/right block or the top/bottom block, a ratio of the left block to the top block is ¼, and a ratio of the right block to the bottom block is ¾. If d is 1, the situation is opposite to the above.

(2) The Case where Only Binary Tree Partition can be Performed

In the table, the partition information may be represented by flags other than a, such as b to e.

For the block A7 in FIG. 4, since the Quad Tree partition may be performed on blocks (A7~A11) before the partition is performed (that is, although the Quad Tree partition can be performed, the Binary Tree partition instead of the Quad Tree partition is performed), it belongs to the case where partition information is generated in (1).

On the contrary, for A8 to A11, since the Binary Tree partition instead of the Quad Tree partition has already been performed on the blocks (A8~A11) before the partition is performed (that is, in the case where no more Quad Tree partition can be performed on the blocks<A8~A11>), it belongs to the case where partition information is generated in (2).

(Third; Bottom-Left Blocks; A12~A15)

In the example, a partition manner of multiple trees (Quad Tree, Binary Tree, and Ternary Tree in the example) is supported, a size and shape of an obtained block may be determined through partition settings of multiple blocks. In the example, it is assumed that a maximum coding block for the Binary Tree/Ternary tree is 64×64, a length of a minimum coding block is 4, and a maximum partition depth is 4.

In the example, the number of blocks obtained by partition is 2 or more (in the example, 2, 3 or 4), partition information needed for once partition is a flag indicating whether to perform partition, a flag indicating partition type and a flag indicating partition direction. The available candidate may be 4M×4N, 4M×2N, 2M×4N, 4M×N/4M×2N/4M×N, and M×4N/2M×4N/M×4N.

If the partition range of Quad Tree is overlapped with the partition range of Binary tree/Ternary tree, and the current block is a block obtained through Quad Tree partition, the partition information may be distinguished and configured by the following cases.

(1) The Case where the Quad Tree Partition is Overlapped with the Binary Tree/Quad Tree Partition

TABLE 2

|          | a | b | c | d |
|----------|---|---|---|---|
| QT       | 1 |   |   |   |
| No Split | 0 | 0 |   |   |
| BT hor   | 0 | 1 | 0 | 0 |
| TT hor   | 0 | 1 | 0 | 1 |
| BT hor   | 0 | 1 | 1 | 0 |
| TT ver   | 0 | 1 | 1 | 1 |

In the table, a is a flag indicating whether to perform Quad Tree partition. If a is 1, it indicates performing Quad Tree partition. If the flag is 0, a flag b indicating whether to perform Binary Tree partition or Ternary tree partition is determined. If b is 0, no partition is performed on the block any more. If b is 1, Binary Tree partition or Ternary Tree partition is performed.

c is a flag indicating the partition direction, if c is 0, it is indicated that horizontal partition is performed. If c is 1, it is indicated that vertical partition is performed. d is a flag indicating the partition type. If d is 0, it is indicated that Binary Tree (BT) partition is performed. If d is 1, it is indicated that Ternary Tree (TT) partition is performed.

(2) The Case where Only Binary Tree Partition can be Performed

In the table, the partition information may be represented by flags other than a, such as b to d.

For the blocks A12 and A15 in FIG. 4, since the Quad tree partition may be performed on blocks A12~A15 before the partition is performed, it belongs to the case where partition information is generated in (1).

On the contrary, for A13 and A14, since the Ternary Tree partition instead of the Quad tree partition has been performed on the blocks (A13 and A14) before the partition is performed, it belongs to the case of partition information is generated in (2).

(Fourth; Bottom-Left Blocks; A16~A20)

In the example, a partition manner of multiple trees (Quad tree, Binary tree and Ternary tree in the example) is supported, a size and shape of an obtained block may be determined through partition settings of multiple blocks. In the example, it is assumed that a maximum coding block for the Binary Tree/Ternary tree is 64×64, a length of a minimum coding block is 4, and a maximum partition depth is 4.

In the example, the number of blocks obtained by partition is 2 or more (in the example, 2, 3 or 4), partition information needed for once partition is a flag indicating whether to perform partition, a flag indicating partition type and a flag indicating partition direction. The available candidate may be 4M×4N, 4M×2N, 2M×4N, 4M×N/4M×3N, 4M×3N/4M×N, M×4N/3M×4N, 3M×4N/M×4N, 4M×N/4M×2N/4M×N, and M×4N/2M×4N/M×4N.

If the partition range of Quad Tree is overlapped with the partition range of Binary tree/Ternary tree, and the current block is a block obtained through Quad Tree partition, the partition information may be distinguished and configured by the following cases.

(1) The Case where the Quad Tree Partition is Overlapped with the Binary Tree/Ternary Tree Partition.

TABLE 3

|          | a | b | c | d | e | f |
|----------|---|---|---|---|---|---|
| QT       | 1 |   |   |   |   |   |
| No Split | 0 | 0 |   |   |   |   |
| TT hor   | 0 | 1 | 0 | 0 |   |   |
| SBT hor  | 0 | 1 | 0 | 1 | 0 |   |
| ABT hor ¼ | 0 | 1 | 0 | 1 | 1 | 0 |
| ABT hor ¾ | 0 | 1 | 0 | 1 | 1 | 1 |
| TT ver   | 0 | 1 | 1 | 0 |   |   |
| SBT ver  | 0 | 1 | 1 | 1 | 0 |   |
| ABT ver ¼ | 0 | 1 | 1 | 1 | 1 | 0 |
| ABT ver ¾ | 0 | 1 | 1 | 1 | 1 | 1 |

In the table, a is a flag indicating whether to perform Quad Tree partition. If a is 1, it indicates performing Quad Tree partition (QT). If the flag is 0, a flag b indicating whether to perform Binary Tree partition is determined. If b is 0, no partition is performed on the block any more. If b is 1, Binary Tree partition or Ternary tree partition is performed.

c is a flag indicating the partition direction. If c is 0, it is indicated that horizontal partition is performed. If c is 1, it is indicated that vertical partition is performed. d is a flag indicating partition type. If d is 0, it is indicated that Ternary tree partition is performed. If d is 1, it is indicated that Binary tree partition is performed. If d is 1, a flag e indicating partition type is determined. Symmetric Binary Tree partition is performed when e is 0. Asymmetric Binary Tree partition is performed when e is 1. If e is 1, the information of the detailed partition ratio in Asymmetric Binary Tree partition is determined, which is the same as the previous example.

(2) The Case where Only Binary Tree Partition can be Performed.

In the table, the partition information may be represented by flags other than a, such as b to f.

Since the block A20 in FIG. 4 belongs to a case where Quad Tree partition can be performed on the blocks (A16~A19) before partition is performed, it belongs to the case where partition information is generated in (1).

On the contrary, for A16~A19, since the Binary tree partition instead of the Quad tree partition has been performed on the blocks (A16~A19) before the partition is performed, it belongs to the case of partition information is generated in (2).

Figure 5:
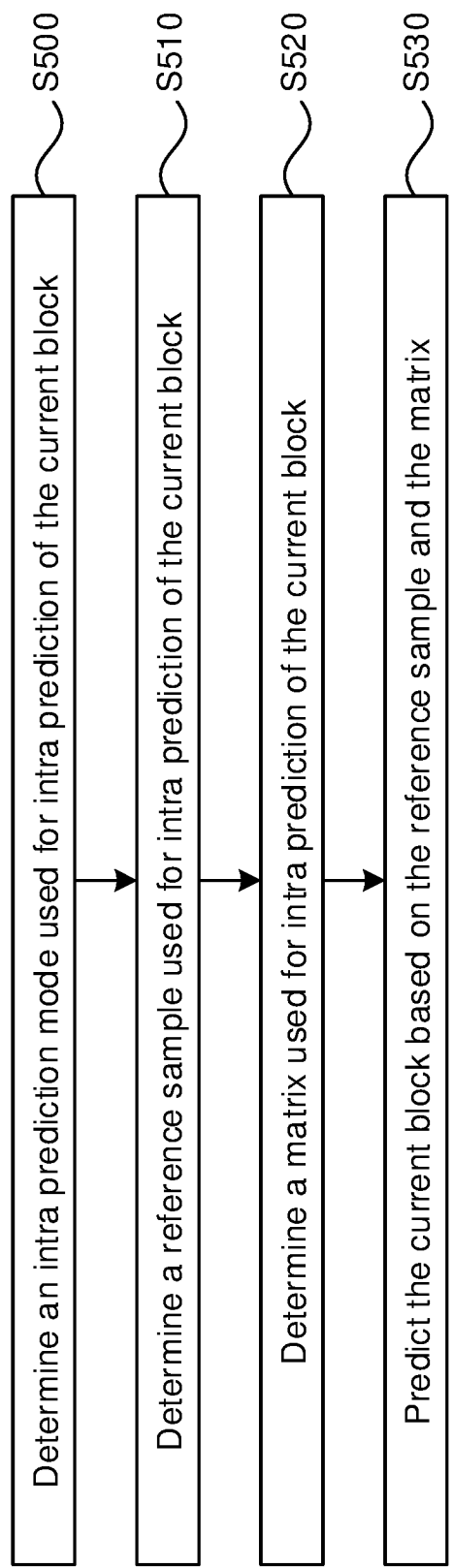
FIG. 5 illustrates a process of performing intra prediction on a current block based on a matrix as an embodiment of the present invention.

FIG. 5 illustrates a process of performing intra prediction on a current block based on matrix as an embodiment of the present invention.

Referring to FIG. 5, an intra prediction mode used for intra prediction of the current block is determined.

When intra prediction is performed on the current block, the encoding/decoding device may determine the intra prediction mode. The current block may be a coding block (CU), a prediction block (PU), a transform block (TU), or any one of these sub-blocks.

(Embodiment 1) The intra prediction mode may be determined based on the information of a transmitted signal. The information may specify any one of N intra prediction modes predefined in the encoding/decoding device. The predefined intra prediction mode indicates all intra prediction modes, which can be used, of the current block. N may be a natural number less than or equal to 67 and greater than or equal to 11 (e.g., 67, 35 and 11). In addition, the value of N may be determined based on a size of the current block. For example, when the current block is smaller than 8×8, N is determined to be 35. Otherwise, N may be determined to be 19 or 11.

(Embodiment 2) The intra prediction mode may also be determined through a default mode or index predetermined in the encoding/decoding device. The default mode may be at least one of Planar mode (index 0), DC mode (index 1), horizontal mode (index 18), vertical mode (index 50), and diagonal mode (index 2, 34, 66). The index corresponds to the case where there are 67 predefined intra prediction modes, and each mode may be assigned with a different index according to a value of N.

(Embodiment 3) The intra prediction mode may be variably determined based on encoding information. The encoding information may not only include information that is encoded and used for transmitting signal in the encoding device, but also include information derived based on the information for transmitting signal in the decoding device. The encoding information may be information related to at least one of a current block or a neighboring block. The neighboring block comprises the spatial and/or temporal neighboring block of the current block, and the spatial neighboring block may represent at least one of the left, top, top-left, bottom-left, or top-right adjacent to the current block.

The encoding information may include: size/shape of the block, availability of the block, partition type, the number of partitions, component type, prediction mode, information about intra prediction mode, inter mode, motion information, transform type, transform skip mode, information about non-zero residual coefficient, scanning order, color format, in-loop filter information, and the like. The size of block may be represented by a width or height, a minimum/maximum value of width and height, a sum of width and height, the number of samples which belong to the block, and the like. The availability of the block may be determined by considering the position of block, the range of the parallel processing area, the decoding order, and the like. The prediction mode may indicate information for indicating intra mode or inter mode. The information about the intra prediction mode may include: whether the intra prediction mode is a non-angular mode, whether the intra prediction mode is a vertical/horizontal mode, the directivity of the intra prediction mode, and information related to the number of predefined intra prediction modes in the encoding/decoding device. The inter mode may indicate information for indicating merge/skip mode, AMVP mode, or reference mode of the current picture. The reference mode of current picture indicates a method of predicting the current block by using the reconstructed regions of the current picture. The current picture may be a picture to which the current block belongs. The current picture may be added into a reference picture list to perform inter prediction, and the current picture may be arranged next to a short-term reference picture or a long-term reference picture in the reference picture list. The motion information may include: a prediction direction flag, a motion vector, a reference picture index, etc.

(Embodiment 4) The intra prediction mode may also be derived based on the MPM list and MPM index. The MPM list includes multiple MPMs, and the MPM may be determined based on the intra prediction mode of the spatial and/or temporal neighboring block of the current block. The number of MPMs is x, and x may be 3, 4, 5, 6, or a greater integer.

For example, the MPM list may include at least one of an intra prediction mode of a neighboring block, mode A, (mode A−n), (mode A+n), or a default mode. The value of n may be 1, 2, 3, 4 or a greater integer. The neighboring blocks may represent blocks adjacent to the left and/or top side of the current block. The default mode may be at least one of a Planar mode, a DC mode, or a predetermined directivity mode. The predetermined directivity mode may include at least one of a horizontal mode (mode V), a vertical mode (mode H), (mode V−k), (mode V+k), (mode H−k), or (mode H+k).

The MPM index may specify an MPM, which is the same as the intra prediction mode of the current block, in the MPM list. That is, the MPM specified by the MPM index may be set as the intra prediction mode of the current block.

Optionally, the intra prediction mode of the current block may be determined by using any one of the above Embodiments 1 to 4, and the intra prediction mode of the current block may be determined based on combinations of at least two of Embodiments 1 to 4. A predetermined flag may be used for the selection. Here, the flag may be encoded by the encoding device and used for transmitting signal.

Referring to FIG. 5, a reference sample used for an intra prediction of the current block is determined (S510).

The reference sample may be derived from the neighboring region of the current block. The neighboring region of the current block may include at least one of the left area, right area, top area, bottom-left area, top-left area, bottom-right area, or top-right area adjacent to the current block.

The neighboring region may include one or more sample lines. Specifically, the number of sample lines belonging to the neighboring region is k, where k may be 1, 2, 3, 4, or may be a natural number greater than these. The value of k may be a fixed value predetermined in the encoding/decoding device, or may be variably determined based on the above encoding information. For example, when the current block is the first size (eg, 4×4, 4×8, 8×4), the neighboring region may be configured to 1 sample line. When the current block is the second size (eg, 8×8, 16×16, etc.), the neighboring region may be configured to 2 sample lines. The sample line may be determined in a vertical direction or a horizontal direction according to the position of the neighboring region. In addition, the sample line may be in contact with the current block, or may be away from the current block at a predetermined distance in the vertical and/or horizontal direction.

The multiple sample lines exist continuously in the vertical and/or horizontal direction with the current block as a reference, or may be separated from each other by a predetermined distance. As an embodiment, when there are two sample lines in the top area adjacent to the current block, they are respectively named as the first sample line and the second sample line in a direction from the bottom sample line of the two lines to upward. Here, the first sample line and the second sample line may be in contact with each other, or may be separated from each other by a predetermined distance. The predetermined distance may be represented by i line lengths (i.e, width or height). i may be 0, 1, 2, 3 or a greater natural number. As an embodiment, when there are three sample lines in the top area adjacent to the current block, they are respectively named as the first sample line, the second sample line, and the third sample line in a direction from the bottom sample line in the plurality of sample lines to upward. Here, the first sample line may be in contact with the second sample line, and the second sample line may be in contact with the third sample line. Alternatively, the first sample line may also be away from the third sample line at the above predetermined distance. Here, the distance (d1) between the first sample line and second sample line may be the same with the distance (d2) between the second sample line and third sample line. Alternatively, d1 may be set to be greater than d2, and on the contrary, d1 may also be set to be less than d2. As an embodiment, when there are more than 4 sample lines in the top area adjacent to the current block, the 4 sample lines may be determined in a same way as the case of the 3 sample lines. In addition, the embodiment may be applied not only to the sample line located on the top area, but also to the sample line located on the left side, and the detailed description is omitted here.

The reference sample may be derived by using all or part of the samples belonging to the neighboring region.

(Embodiment 1) Some samples in the neighboring region may be samples at positions predetermined in the encoding/decoding device. The predetermined positions may include at least one of the leftmost sample, the rightmost sample, or the middle sample of the top sample line. The predetermined positions may include at least one of the topmost sample, the bottommost sample, or the middle sample of the left sample line. Alternatively, the predetermined positions may include at least one of the odd-numbered samples of the top sample line and/or the left sample line, or at least one of the odd-numbered samples. Alternatively, the predetermined positions may also include samples, whose x-coordinates are multiples of j, among samples of the top sample line, or samples, whose y-coordinates are multiples of j, among samples of the left sample line. Where, j may be 2, 3, 4, or a greater natural number.

(Embodiment 2) Some samples of the neighboring region are determined based on encoding information. The encoding information is as described above, and detailed descriptions are omitted here.

Optionally, some samples may be specified by use of any one of the above embodiment 1 or embodiment 2, or based on a combination of the embodiment 1 and embodiment 2. Here, as described above, the distances between some samples may be set the same, but it is not limited to this, and the distances between some samples may also be set differently.

The number of the some samples may be 1, 2, 3, 4 or more, which is predefined in the encoding/decoding device. In addition, the numbers of samples may be defined differently for the left area of the neighboring region and the top area of the neighboring region of the current block. For example, when the width of the current block is greater than the height of the current block, the number (numSamA) of samples belonging to the top area of the neighboring region may be greater than the number of samples (numSamL) belonging to the left area neighboring region. On the contrary, when the width of the current block is smaller than the height, numSamA may be smaller than numSamL Alternatively, the number of some samples may also be variably determined based on the above encoding information.

The samples in the neighboring region may be prediction samples or reconstructed samples. The prediction samples may be obtained through intra prediction or inter prediction. The reconstructed samples may be reconstructed samples before the in-loop filter is applied, or may be reconstructed samples after the in-loop filter is applied.

On the other hand, the reference samples may be derived directly from the samples of the neighboring region (CASE 1), or may be derived by performing down-sampling for the samples of the neighboring region (CASE 2). Optionally, any one of CASE 1 and CASE 2 may be used. The selection may be made based on the above encoding information. For example, when the size of the current block is less than a predetermined threshold, reference sample may be derived based on CASE 1, otherwise, reference sample may be derived based on CASE 2. Where, the size may be represented by any one of a width, a height, a maximum/minimum value of width and height, a ratio of width to height, or a product of width and height of the current block. As an example, when the current block is smaller than 8×8, the reference sample may be derived from the samples of the neighboring region; otherwise, the reference sample may be derived by performing down-sampling on the samples of the neighboring region. The method of down-sampling may be understood more by referring to FIG. 6 and FIG. 7.

Referring to FIG. 5, a matrix used for intra prediction of the current block may be determined (S520).

The matrix may be determined based on at least one of the intra prediction mode or the size of the current block determined in operation S500. Alternatively, it may be limited that the matrix may be determined by considering the intra prediction mode of the current block only. Or the matrix may be determined by considering the size of the current block only. The size may be represented by any one of width or height, the minimum/maximum value of width and height, the sum of width and height, the number of samples belonging to the current block, and the like. However, it is not limited to this, and the matrix may be determined by further consideration of encoding information of the current block. The encoding information is as described above, and detailed descriptions are omitted here.

Specifically, the matrix predetermined in the encoding/decoding device may be divided into a plurality of matrix groups. The plurality of matrix groups may be configured by a first matrix group, a second matrix group, . . . , an m-th matrix group. Where, m may be 2, 3, 4, 5 or a greater natural number. Optionally, the current block may use any one of the plurality of matrix groups based on the size of the current block. For example, the first matrix group may be used when the size of the current block is 4×4, and the second matrix group may be used when the size of the current block is 8×4, 4×8, and 8×8, and in other cases, the third matrix group may be used. The matrix group selected based on the size of the current block may include one or more candidate matrices. Any one of a plurality of candidate matrices may be determined by the matrix of the current block. The determination may be made based on the encoding information (e.g., intra prediction mode) of the current block.

The number of the predetermined matrices may be the same as the number of the above predefined intra prediction modes. In addition, the number of the predetermined matrices may be less than the number of the predefined intra prediction modes. Here, one matrix may be matched with a plurality of intra prediction modes. For example, one matrix may be matched with 2 intra prediction modes. Here, the number of the predetermined matrices may have a value that is ½ times of the number of predefined intra prediction modes. However, it is not limited to this, and the number of intra prediction modes matched with one matrix may be 3, 4, 5, 6 or more.

As an embodiment, the matching may be determined by considering the directivity and/or symmetry of the intra prediction mode.

The predefined intra prediction mode may include a directivity mode having a predetermined angle. The directivity modes may be divided into a first mode group with horizontal directivity and a second mode group with vertical directivity. It is assumed that the number of the angular modes is 65, the first mode group may be configured as modes between index 2 and index 34, and the second mode group may be configured as modes between index 34 and index 66.

The encoding/decoding device only defines the matrix for the first mode group, and the second mode group may also use the matrix defined for the first mode group. On the contrary, the encoding/decoding device only defines the matrix for the second mode group, and the first mode group may also use the matrix defined for the second mode group. Here, the number of the determined matrices may have a value of ½ times of the number of predefined intra prediction modes. As an embodiment, when the number of the mode groups having symmetry is x, the number of predetermined matrices may have a value of 1/x times of the number of predefined intra prediction modes. Where, x may be 3, 4 or more.

The symmetry may include, by taking an intra prediction mode with an angle of −45° as a reference, the symmetry of a prediction angle between a mode with vertical directivity and a mode with horizontal directivity. The intra prediction mode with directivity has a prediction angle (PredAngle) depending to various directivities. The mode with vertical directivity may include, by taking the intra prediction mode with the angle of −45° as a reference, the mode and a mode with an angle of −45°≤(PredAngle) 45° along the x-axis direction from the mode. The mode with horizontal directivity may include, by taking the intra prediction mode with the angle of −45° as a reference, modes other than the mode and having an angle of −45°<(PredAngle)≤45° along the y-axis direction from the mode.

Referring to FIG. 5, the current block may be predicted based on the reference sample and the matrix (S530).

When the reference sample is determined in operation S510 and the matrix is determined in operation S520, the encoding/decoding device may predict the current block based on the reference sample and matrix.

The operation of predicting the current block may include following operation. The matrix is applied to the reference sample to obtain a prediction sample (hereinafter, referred to as a first prediction sample) of a DS block. The DS block may represent the current block or the down-sampled current block. That is, the DS block may have the same size as the current block, and the DS block may also have a size of ½, ¼, ⅛, or 1/16 of the size (at least one of width or height) of the current block. For example, when the current block is a 4×4, 4×8, or 8×4 block, the DS block may be a 4×4 block. Or, when the current block is an 8×8, 8×16, or 16×8 block, the DS block may be a 4×4 or 8×8 block. Or, when the current block is greater than or equal to 16×16, the DS block may be an 8×8 or 16×16 block. However, the DS block is not limited to a square block, and may also be a non-square block. Alternatively, the DS block may be limited to a square block. The application of the matrix may comprise multiplying the reference sample by a weighted value obtained from the matrix.

The operation of obtaining the first prediction samples may include: at least one of an operation of adding an offset value or an operation of filtering.

The operation of obtaining the first prediction samples may further include the following operation. Re-arrangement is performed on the first prediction samples. The re-arrangement may be performed only when a plurality of intra prediction modes are matched with one matrix.

Alternatively, the re-arrangement may be performed when the intra prediction mode of the current block belongs to the first mode group with horizontal directivity. For example, when the intra prediction mode of the current block belongs to the first mode group with horizontal directivity, rearrangement for the first prediction samples of the DS block is performed. And when the intra prediction mode of the current block belongs to the second mode group with vertical directivity, the rearrangement for the first prediction samples of the DS block may not be performed.

On the contrary, the re-arrangement may be performed when the intra prediction mode of the current block belongs to the first mode group with vertical directivity. For example, when the intra prediction mode of the current block belongs to the first mode group with horizontal directivity, the re-arrangement for the first prediction samples of the DS block may not be performed. When the intra prediction mode of the current block belongs to the second mode group with vertical directivity, the re-arrangement for the first prediction samples of the DS block may be performed.

The re-arrangement may be performed through the Equitation 1 below. In the equitation, x may represent a value of the coordinate of the x-axis, and y may represent a value of the coordinate of the y-axis. That is to say, the re-arrangement may represent a process of assigning a first prediction sample with coordinates of (x, y) to the coordinates of (y, x).

$$First\_prediction\_sample[x][y]=First\_prediction\_sample[y][x] \qquad \text{Equitation 1}$$

Alternatively, the re-arrangement according to the present invention may also represent a process in which the DS block composed of the first prediction samples is rotated at a predetermined angle. The predetermined angle may indicate 90 degrees or 180 degrees in a clockwise direction, or may indicate 90 degrees or 180 degrees in a counterclockwise direction.

The operation of predicting the current block may further include the following operation. Up-sampling is performed on the current block based on at least one of neighboring reconstructed samples or the first prediction samples to obtain a second prediction sample.

In the up-sampling process, at least one of whether to perform the up-sampling or the method for performing up-sampling may be determined based on the encoding information of the current block. For example, at least one of whether to perform the up-sampling or the method for performing up-sampling may be determined based on the size of the DS block composed of the first prediction samples and the size of the current block. The size of block may be represented by a width or height, a minimum/maximum value of width and height, a sum of width and height, the number of samples belonging to the block, and the like.

Whether to perform the up-sampling may be determined only when the size of the DS block composed of the first prediction samples is smaller than the size of the current block.

The method for performing up-sampling may include the following operations. The ratio of the size of the DS block composed of the first prediction samples to the size of the current block is used. The first prediction samples are allocated to predetermined positions in the current block. Interpolation is performed on the remaining regions in the current block. The remaining regions may represent regions in the current block except for the regions divided for the first prediction samples. The division for the first prediction samples and the interpolation method for the remaining regions will be described in detail with reference to FIG. 8 to FIG. 10.

Figure 6:
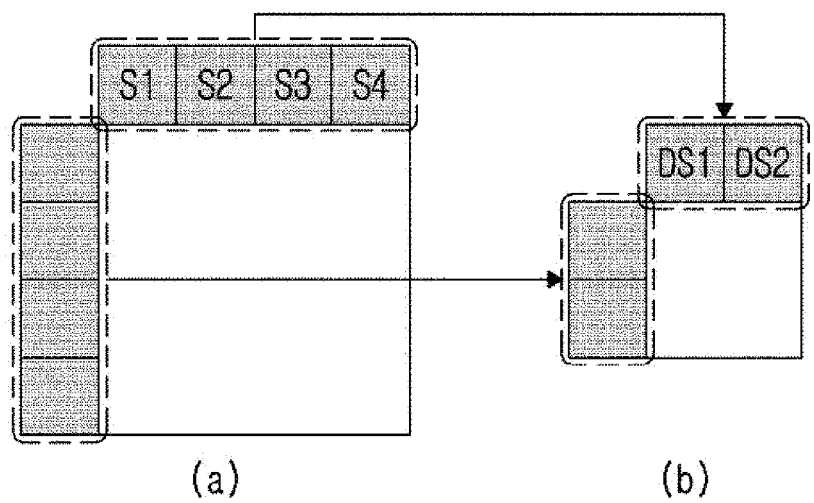
FIG. 6 illustrates a method for determining a reference sample by performing down-sampling on the neighboring region as an embodiment applied to the present invention.

FIG. 6 illustrates a method for determining a reference sample by performing down-sampling on the neighboring region as an embodiment applied to the present invention.

Referring to FIG. 6, (a) of FIG. 6 illustrates a case where the neighboring region used for intra prediction is located on the left side and top area adjacent to the current block. In addition, as an embodiment, the sample line located on the left side of the current block is in contact with the current block, and is composed of one sample line in the vertical direction. The sample line located on the top area of the current block is in contact with the current block and is composed of one sample line in the horizontal direction.

The reference sample may include a down-sampling region formed by performing down-sampling on the neighboring region of the current block.

The down-sampling region may be derived from an average, a maximum, a minimum, a mode, or a filtered value of all or some samples belonging to the neighboring region.

When derived from the average value, the down-sampling region may be formed by a method of allocating an average value of N different samples to the samples in the down-sampling region.

The different N samples may be consecutively arranged samples, or may be separated by a certain interval. The certain interval may be an interval of one or more sample sizes. When there is a plurality of intervals, the plurality of intervals may be uniform or uneven (where, N is greater than 2 and less than the total number of samples belonging to the neighboring region). In addition, the combination of the different N samples is referred to as a sample group. Here, the first sample group may overlap with the second sample group, or may not overlap with the second sample group.

As an example, FIG. 6 shows that N is 2, the two sample groups do not overlap with each other, and an average value of two samples belonging to each sample group is allocated to one sample in the down-sampling region to perform down-sampling.

Alternatively, 3 consecutive samples (S1, S2, and S3) may constitute the first sample group, and the average value of the three samples belonging to the first sample group may be allocated to the samples (DS1) in the down-sampling region. Three consecutive samples (S2, S3, and S4) may constitute the second sample group, and an average value of the three samples belonging to the second sample group may be allocated to the samples (DS2) in the down-sampling region.

Alternatively, after the minimum or maximum value of the two samples (S1, S2) belonging to the first sample group is determined, it may be allocated to the sample (DS1) in the down-sampling region. Similarly, after the minimum or maximum value of the two samples (S3, S4) belonging to the second sample group is determined, it may be allocated to the sample (DS2) in the down-sampling region. It may be performed similarly when the first/second sample group is composed of three samples.

Alternatively, in the top part of the neighboring region, samples at predefined positions among the multiple samples belonging to the first sample group may be allocated to the sample (DS1) in the down-sampling region, and samples at predefined positions among the multiple samples belonging to the second sample group may be allocated to the sample (DS2) in the down-sampling region. The predefined positions may represent fixed positions predetermined in the encoding/decoding device. As an example, it may be any one of the leftmost, rightmost, or middle positions. In the left part of the neighboring region, samples at predefined positions among multiple samples belonging to each sample group may also be allocated to a respective sample in the down-sampling region. Here, the predefined positions may be any one of the topmost, bottommost, or middle position.

Figure 7:
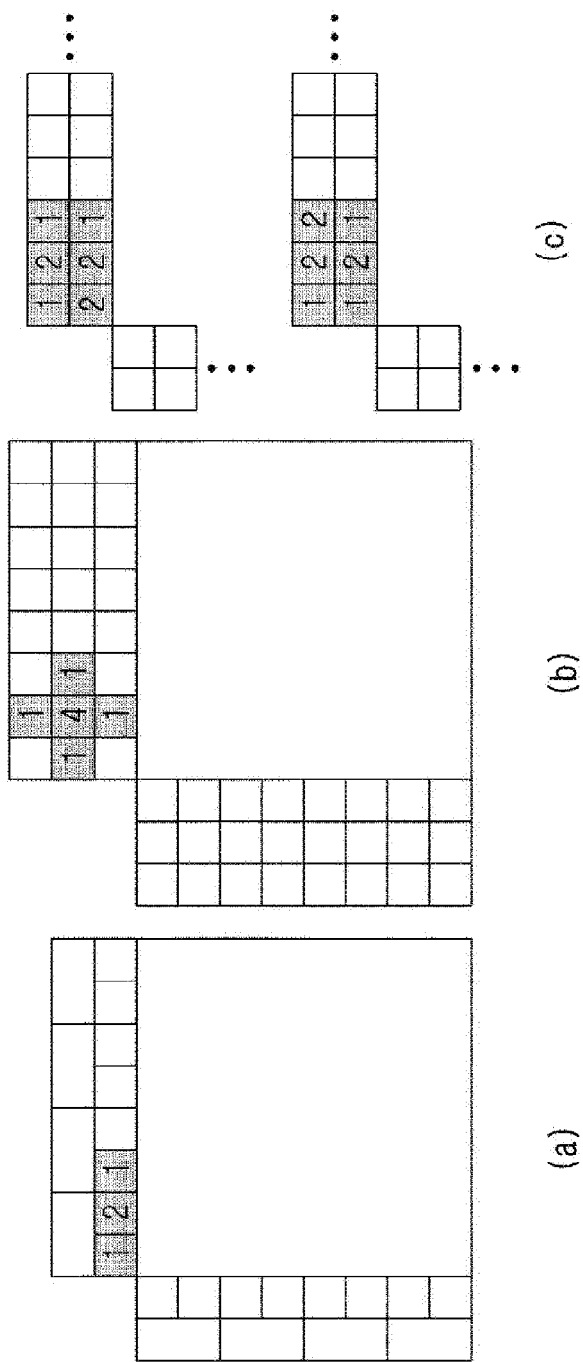
FIG. 7 illustrates a method for down-sampling based on a weighted average as an embodiment applied to the present invention.

FIG. 7 illustrates a method for down-sampling method based on a weighted average as an embodiment applied to the present invention.

In the embodiment, the average value may be calculated by the following equation (hereinafter, referred to as the first average equation):

$$\text{a sum of samples belonging to a sample group/the number of the samples;}$$

Or, the average value may be calculated by the following equation (hereinafter, referred to as the second average equation):

$$\text{Sum(a weighted value} \times \text{a sample belonging to the sample group)/the number of the samples}$$

FIG. 7 (a) shows a case where the above sample group is composed of three samples. Here, the weighted values applicable to the 3 samples may be determined as a ratio of 1:2:1. As shown in FIG. 7 (b), when the sample group is composed of 5 samples, the weighted values may be determined as a ratio of 1:1:4:1:1. As shown in FIG. 7 (c), when the sample group is composed of 6 samples, the weighted value may be determined as a ratio of 1:2:1:2:2:1 or 1:2:2:1:2:1 in the Z direction with the top-left part as a starting point. In addition, although FIG. 7 (a) and FIG. 7 (c) show the weighted values applied to the top part of the neighboring region, this may also be applied to the left part of the neighboring region.

The average value may also include a result value derived by applying a predetermined operation to a plurality of average values calculated by the first average equation or the second average equation. The predetermined operation may be the above first average equation or second average equation. For example, if 3 samples (i.e., the first sample to the third sample) belong to the sample group, an average value (a first value) of the first sample and the second sample and an average value (a second value) of the second sample and the third sample may be calculated respectively. The average value may be derived from an average value of the calculated first value and second value.

The above down-sampling method may be applied to the top part of the neighboring region only. On the contrary, it may also be applied to the left part of the neighboring region only. Alternatively, the down-sampling method (hereinafter, referred to as the first method) according to FIG. 6 may be applied to any one of the top part or left part of the neighboring region. The down-sampling method (hereinafter, referred to as the second method) according to FIG. 7 may be applied to another one of the top part or left part of the neighboring region.

In addition, considering the size/shape of the current block, at least one of the first method or the second method may be used optionally. For example, when the width of the current block is greater than a predetermined threshold, the first method may be applied to the top part of the neighboring region of the current block. Otherwise, the second method may be applied. Down-sampling may also be performed on the height of the current block in a same way. Or, when the current block is non-square, the first method may be applied to any one of the top part or left part of the neighboring region, and the second method may be applied to another area. Here, when the width of the current block is greater than the height, the first method may be applied to the top part of the neighboring region, and the second method may be applied to the left part of the neighboring region. On the contrary, when the width of the current block is smaller than the height, the second method may be applied to the top part of the neighboring region, and the first method may be applied to the left part of the neighboring region. When the current block is a square, a same down-sampling method may be used for the top part and left part of the neighboring region, where the down-sampling method may be limited to the first method.

Figure 8:
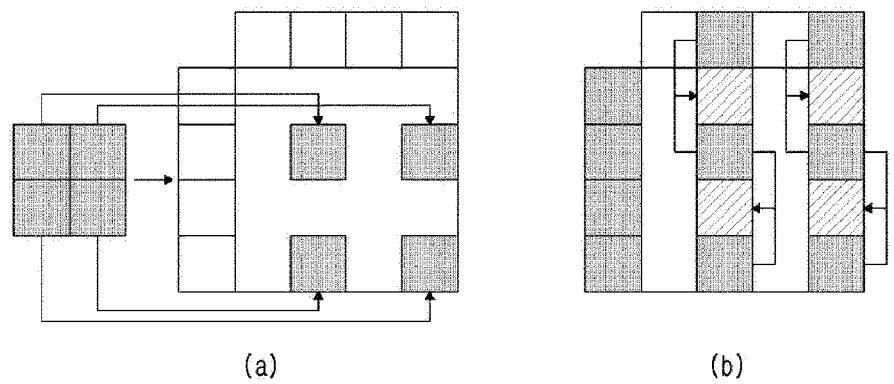
FIG. 8 illustrates the partition of the first prediction sample and the method for interpolating the remaining regions as an embodiment applied to the present invention.

FIG. 8 illustrates the division of the first prediction sample and the method for interpolating the remaining regions as an embodiment applied to the present invention.

Referring to FIG. 8 (a), the prediction samples of the DS block may be allocated to the prediction samples at predetermined positions in the current block. The predetermined positions may be determined by considering a ratio of the size of the current block to the size of the DS block. For example, a corresponding relationship of the prediction samples between the DS block and the current block may be defined through a following Equation 2.

$$\text{First Prediction\_Sample\_}curBLK[(x+1)\times r-1][(y+1)\times r-1] = \text{First\_Prediction\_Sample\_}dsBLK[x][y] \quad \text{Equation 2}$$

Here, r represents a ratio of the size of the current block to the size of the DS block, and x and y are the x-axis and y-axis coordinates of a first prediction sample in each DS block. The First Prediction_Sample_curBLK may indicate a position of the first prediction sample in the current block, and the First_Prediction_Sample_dsBLK may indicate a position of the first prediction sample in the DS block.

Regarding the interpolation, referring to FIG. 8(b), at least one (hereinafter, referred to as interpolation reference sample) of the first prediction samples divided for the current block or reconstructed samples adjacent to the current block may be used to derive samples that are not divided for the first prediction samples in the current block (hereinafter, referred to as interpolation object samples). In addition, the interpolation reference sample may also include a prediction sample generated through interpolation before the current interpolation object sample (that is, the previous interpolation object sample).

The position and range of the reconstructed sample adjacent to the current block are the same as the above reference sample, and thus detailed descriptions are omitted here.

According to the position of the interpolation object sample, the interpolation reference sample may be composed of a plurality of first prediction samples, or may be composed of at least one first prediction sample and at least one reconstructed neighboring sample. Optionally, the reconstructed neighboring samples may use any one of samples having a same x-coordinate or a same y-coordinate as the interpolation object sample, or may use samples that at least one of the x-coordinate or y-coordinate is the same as the interpolation object sample. The selection may be made based on the position of the interpolation object sample. For example, if the interpolation object sample has the same x coordinate as the first prediction sample, the reconstructed neighboring samples may only include samples with the same x coordinate as the interpolation object sample. On the contrary, if the interpolation object sample has the same y coordinate as the first prediction sample, the reconstructed neighboring samples may only include samples with the same y coordinate as the interpolation object sample. Alternatively, the reconstructed neighboring samples may also include multiple samples located on the same horizontal and vertical lines as the interpolation target samples.

The interpolation object sample may be derived from a representative value of a plurality of interpolation reference samples, where the representative value may include one of the following: an average, a minimum, a maximum, a mode, and an intermediate value.

The average value may be calculated through the following equation (hereinafter, referred to as the first average equation):

a sum of difference reference samples/the number of difference reference samples Or, the average value may be calculated through the following equation (hereinafter, referred to as the second average equation):

Sum(a weighted value×a difference reference sample)/the number of difference reference samples The weighted value according to the second average expression may be determined based on a relative/absolute distance between the interpolation object sample and the interpolation reference sample, which is described in detail with reference to FIG. 9.

Figure 9:
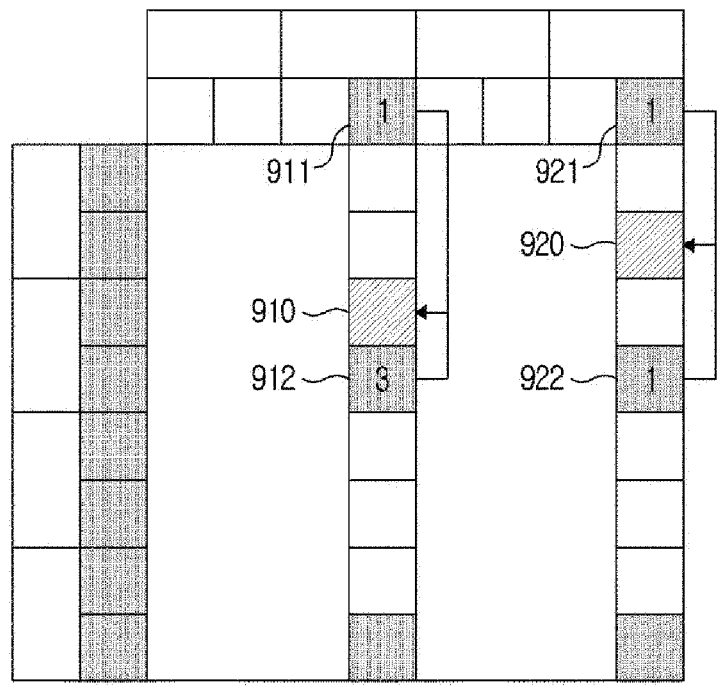
FIG. 9 illustrates the weight value for the distance assigned in the interpolation operation as an embodiment applied to the present invention.

FIG. 9 illustrates the weight value for the distance assigned in the interpolation operation as an embodiment applied the present invention.

The weighted value according to the present invention may include a weighted value determined based on the distance between the interpolation object sample and the interpolation reference sample. As an embodiment, referring to FIG. 9, if interpolation is performed on the first interpolation object sample 910, since a ratio of a distance between the first interpolation object sample 910 and the first interpolation reference sample 911 to a distance between the first interpolation target sample 910 and the second interpolation reference sample 912 is 3:1, a ratio of the weighted value ratios applicable to the first interpolation reference sample 911 and the second interpolation reference sample 912 may be 1:3. If interpolation is performed on the second interpolation object sample 920, since a ratio of a distance between the second interpolation target sample 920 and the second interpolation reference sample 921 to a distance between the second interpolation target sample 920 and the second interpolation reference sample 922 is 1:1, a ratio of the weighted values applicable to the first interpolation reference sample 921 and the second interpolation reference sample 922 may be 1:1.

In addition, the interpolation filter according to the present invention may have directivity. The directivity may include vertical, horizontal, z-shaped, diagonal and the like.

The interpolation may be performed based on a predetermined priority order. The priority order may be either the case of performing interpolation in the horizontal direction after performing interpolation in the vertical direction (the first order) or the case of performing interpolation in the vertical direction after performing interpolation in the horizontal direction (the second order). Or interpolation may be performed in the vertical direction and the horizontal direction at the same time (the third order).

Only one of the above first order to the third order may be used for performing interpolation, or combinations of at least two of the first order to the third order may be used for performing interpolation. For the interpolation sequence, please refer to FIG. 10 for details.

Figure 10:
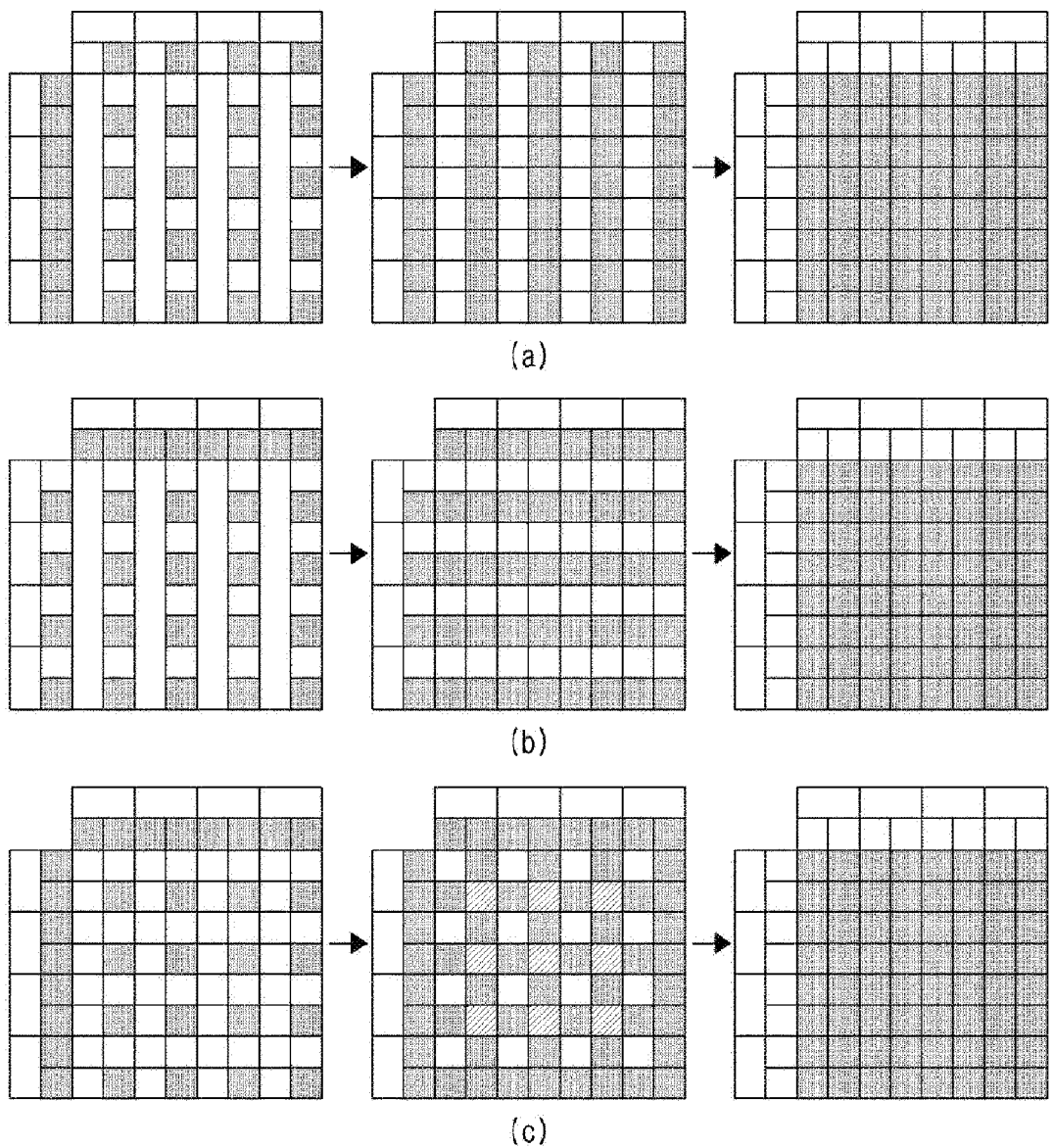
FIG. 10 illustrates the sequence of the operations of interpolation as an embodiment applied to the present invention.

FIG. 10 illustrates the sequence of operations of interpolation as an embodiment applied to the present invention.

The FIG. 10 (a) shows about the first order in FIG. 9. Specifically, the interpolation may be performed on the vertical line belonging to the first prediction samples firstly, and then the interpolation may be performed on the horizontal line based on the interpolated line and the interpolation reference sample at the left side of the current block.

The FIG. 10 (b) shows about the second order in FIG. 9. Specifically, the interpolation may be performed on the horizontal line belonging to the first prediction samples firstly, and then the interpolation may be performed on the vertical line based on the interpolated line and the interpolation reference sample on the top part of the current block.

The FIG. 10 (c) shows about the third order in FIG. 9. Firstly, the interpolation may be performed on the vertical line and horizontal line belonging to the first prediction samples. Then, the interpolation may be performed on the remaining samples that have not been interpolated. Here, only the interpolation may be performed on the vertical line or the horizontal line only, or the interpolation may be performed on the vertical line and the horizontal line at the same time. If the interpolation is performed on the vertical line and the horizontal line at the same time, one interpolation object sample may have a first interpolation value on the vertical line and a second interpolation value on the horizontal line at the same time. Here, a representative value for the first interpolation value and the second interpolation value may be allocated to the interpolation object sample. Where, the representative value may be derived from an average value, a minimum, a maximum, a mode, or an intermediate value.

The interpolation order may be an order predetermined in the encoding/decoding device, or may be determined based on the encoding information of the current block optionally. The encoding information is as described above, and thus detailed descriptions are omitted.

The order may be determined based on a size of the block. The size of block may be represented by a width or height, a minimum/maximum of width and height, a sum of width and height, the number of samples belonging to the block, and the like.

For example, when the size of the current block is greater than a predetermined threshold, the first interpolation may be performed. Otherwise, the second interpolation may be performed. On the contrary, when the size of the current block is less than the predetermined threshold, the second interpolation may be performed. Otherwise, the first interpolation may be performed. The threshold may be 8, 16, 32 or a greater natural number.

Some embodiments of the prevent invention provides an encoder. The encoder includes a processor and a memory. The memory is configured to store computer programs capable of running in the processor, and when the computer programs are run by the processor, the processor is configured to implement the methods above.

Some embodiments of the prevent invention provides a decoder. The decoder includes a processor and a memory. The memory is configured to store computer programs capable of running in the processor, and when the computer programs are run by the processor, the processor is configured to implement the methods above.

The invention claimed is:

1. A method for video signal processing, performed by a decoder, comprising:
   determining an intra prediction mode of a current block;
   determining a reference sample used for an intra prediction of the current block;
   obtaining a predetermined matrix based on the intra prediction mode; and
   predicting the current block based on the reference sample and the matrix, wherein predicting the current block based on the reference sample and the matrix comprises:
      generating a prediction block by applying the matrix to the reference sample, wherein the prediction block is generated at predetermined positions in the current block;
   wherein predicting the current block based on the reference sample and the matrix further comprises:
      performing interpolation on the current block based on at least one of the following: the prediction block or reconstructed samples adjacent to the current block.

2. The method according to claim 1, wherein determining the reference sample comprises:
   determining a neighboring region of the current block; and
   performing down-sampling on the determined neighboring region, wherein the neighboring region is divided into a plurality of sample groups, the sample group comprises one or more samples, a representative value of the sample group is determined as the reference sample, and the representative value is one of the following: an average, a minimum, a maximum, a mode value and an intermediate value.

3. The method according to claim 1, wherein the predetermined positions in the current block are determined based on a ratio of the size of the current block to a size of a sampling block.

4. The method according to claim 1, wherein predicting the current block based on the reference sample and the matrix further comprises:
   performing a transpose of prediction samples of the generated prediction block.

5. The method according to claim 1, wherein the matrix is determined from a plurality of matrix groups by further consideration of a size and shape of the current block.

6. A method for video signal processing, performed by an encoder, comprising:
   determining an intra prediction mode of a current block;
   determining a reference sample used for an intra prediction of the current block;
   obtaining a predetermined matrix based on the intra prediction mode; and
   predicting the current block based on the reference sample and the matrix, wherein predicting the current block based on the reference sample and the matrix comprises:
      generating a prediction block by applying the matrix to the reference sample, wherein the prediction block is generated at predetermined positions in the current block;
   wherein predicting the current block based on the reference sample and the matrix further comprises:
      performing interpolation on the current block based on at least one of the following: the prediction block or reconstructed samples adjacent to the current block.

7. The method according to claim 6, wherein determining the reference sample comprises:
   determining a neighboring region of the current block; and
   performing down-sampling on the determined neighboring region, wherein the neighboring region is divided into a plurality of sample groups, the sample group comprises one or more samples, a representative value of the sample group is determined as the reference sample, and the representative value is one of the following: an average, a minimum, a maximum, a mode value and an intermediate value.

8. The method according to claim 6, wherein the predetermined positions in the current block are determined based on a ratio of the size of the current block to a size of a sampling block.

9. The method according to claim 6, wherein predicting the current block based on the reference sample and the matrix further comprises:
   performing a transpose of prediction samples of the generated prediction block.

10. The method according to claim 6, wherein the matrix is determined from a plurality of matrix groups by further consideration of a size and shape of the current block.

11. A decoder, comprising:
   a processor; and
   a memory, wherein the memory is configured to store computer programs capable of running in the processor, and when the computer programs are run by the processor, the processor is configured to:
   determine an intra prediction mode of a current block;
   determine a reference sample used for an intra prediction of the current block;
   obtain a predetermined matrix based on the intra prediction mode; and
   generate a prediction block by applying the matrix to the reference sample, wherein the prediction block is generated at predetermined positions in the current block;
   wherein the processor is further configured to:
      perform interpolation on the current block based on at least one of the following:
      the prediction block or reconstructed samples adjacent to the current block.

12. The decoder according to claim 11, wherein the processor is further configured to:
   determine a neighboring region of the current block; and
   perform down-sampling on the determined neighboring region, wherein the neighboring region is divided into a plurality of sample groups, the sample group comprises one or more samples, a representative value of the sample group is determined as the reference sample, and the representative value is one of the following: an average, a minimum, a maximum, a mode value and an intermediate value.

13. The decoder according to claim 11, wherein the predetermined positions in the current block are determined based on a ratio of the size of the current block to a size of a sampling block.

14. The decoder according to claim 11, wherein the processor is further configured to:
   perform a transpose of prediction samples of the generated prediction block.

15. The decoder according to claim 11, wherein the matrix is determined from a plurality of matrix groups by further consideration of a size and shape of the current block.

16. An encoder, comprising:
   a processor; and
   a memory, wherein the memory is configured to store computer programs capable of running in the processor, and when the computer programs are run by the processor, the processor is configured to:
   determine an intra prediction mode of a current block;
   determine a reference sample used for an intra prediction of the current block;
   obtain a predetermined matrix based on the intra prediction mode; and
   generate a prediction block by applying the matrix to the reference sample, wherein the prediction block is generated at predetermined positions in the current block;
   wherein the processor is further configured to:
      perform interpolation on the current block based on at least one of the following:
      the prediction block or reconstructed samples adjacent to the current block.

17. The encoder according to claim 16, wherein the processor is configured to:
   determine a neighboring region of the current block; and
   perform down-sampling on the determined neighboring region, wherein the neighboring region is divided into a plurality of sample groups, the sample group comprises one or more samples, a representative value of the sample group is determined as the reference sample, and the representative value is one of the following: an average, a minimum, a maximum, a mode value and an intermediate value.

18. The encoder according to claim 16, wherein the predetermined positions in the current block are determined based on a ratio of the size of the current block to a size of a sampling block.

19. The encoder according to claim 16, wherein the processor is further configured to:
   perform a transpose of prediction samples of the generated prediction block.

20. The encoder according to claim 16, wherein the matrix is determined from a plurality of matrix groups by further consideration of a size and shape of the current block.

* * * * *